US009390424B2

(12) United States Patent
Hendrickson

(10) Patent No.: US 9,390,424 B2
(45) Date of Patent: Jul. 12, 2016

(54) SYSTEM AND METHOD FOR IMPROVING CUSTOMER WAIT TIME, CUSTOMER SERVICE, AND MARKETING EFFICIENCY IN THE RESTAURANT, RETAIL, HOSPITALITY, TRAVEL, AND ENTERTAINMENT INDUSTRIES

(76) Inventor: Bradley Marshall Hendrickson, Manchester, MO (US)

( * ) Notice: Subject to any disclaimer, the term of this patent is extended or adjusted under 35 U.S.C. 154(b) by 0 days.

(21) Appl. No.: 13/088,046

(22) Filed: Apr. 15, 2011

(65) Prior Publication Data
US 2012/0016745 A1    Jan. 19, 2012

Related U.S. Application Data

(63) Continuation of application No. 11/741,704, filed on Apr. 27, 2007, now abandoned.

(51) Int. Cl.
*G06Q 30/00* (2012.01)
*G06Q 50/00* (2012.01)
(Continued)

(52) U.S. Cl.
CPC ............... *G06Q 30/02* (2013.01); *G06Q 10/00* (2013.01); *G06Q 20/20* (2013.01);
(Continued)

(58) Field of Classification Search
CPC ..................................................... G06Q 30/00
USPC ......................................................... 705/5, 15
See application file for complete search history.

(56) References Cited

U.S. PATENT DOCUMENTS 5,502,806 A    3/1996  Mahoney et al.
5,602,730 A *  2/1997  Coleman et al. ................ 705/15
(Continued)

FOREIGN PATENT DOCUMENTS

WO    WO 2008/134352    11/2008

OTHER PUBLICATIONS

"Buffalo Wild Wings® Sauces up Food Quality with Complete Kitchen Management Solution from QSR Automations; Service Pioneer Relies on QSR's Industry Leading Kitchen Software and Hardware to Coordinate Preparation of its Award-Winning Menu Items"; Business Wire; New York; Jul. 25, 2006; p. 1.
(Continued)

*Primary Examiner* — Seye Iwarere

(57) ABSTRACT

A system and method including an Internet preordering system accessible online or onsite at a free-standing kiosk located in or near client properties in which customers may create profiles for the requested services and provide such information to the service provider in advance of the customer's arrival for the requested services. When the customer arrives, the customer identifies himself/herself and the preorder is accessed, verified and/or modified. The preorder is then forwarded to the service provider and the delivery of the service is optimally timed to the readiness of the customer. The customer's profile and preorder information are maintained in a database and used for in-house precision marketing campaigns and cross-promotional opportunities. For example, in a restaurant embodiment, a registered customer is given access to menus and may create menu preferences for a participating restaurant. The registered customer may also make a reservation at a participating restaurant for a party of any size in advance (for example, up to 24 hours) of the reservation time. The food and/or drink preorder for each guest in the party may be completed in advance and maintained on the server, with the reservation time, for access when the party arrives at the designated reservation time. After a verification process, the customer may retrieve the party's preorder, make any desired changes, and then verify the preorder at the kiosk. Once the preorder is verified, the customer may finalize the preorder and proceed to the hostess kiosk where the preorder is accessed by the restaurant staff. Either when the party is seated or at an appropriate time prior to seating (based on a comparison of the seating wait queue to the kitchen wait queue), the preorder is forwarded for preparation so that the ordered food and/or drink arrives shortly after the customer's party is seated.

34 Claims, 38 Drawing Sheets

(51) Int. Cl.
*G06Q 30/02* (2012.01)
*G06Q 10/00* (2012.01)
*G06Q 20/20* (2012.01)
*G06Q 50/12* (2012.01)

(52) U.S. Cl.
CPC ....... *G06Q 30/0226* (2013.01); *G06Q 30/0255* (2013.01); *G06Q 30/0269* (2013.01); *G06Q 30/0271* (2013.01); *G06Q 50/12* (2013.01)

(56) References Cited

U.S. PATENT DOCUMENTS

| | | | |
|---|---|---|---|
| 6,791,575 | B2 | 9/2004 | Abboud |
| 6,873,969 | B2 | 3/2005 | Stone et al. |
| 6,876,973 | B1 | 4/2005 | Visconti |
| 7,022,017 | B1 | 4/2006 | Halbritter et al. |
| 7,069,228 | B1 | 6/2006 | Rose et al. |
| 7,110,964 | B2 | 9/2006 | Tengler et al. |
| 8,041,605 | B1* | 10/2011 | Harrity .......................... 705/15 |
| 2002/0143638 | A1* | 10/2002 | August et al. ................... 705/26 |
| 2004/0012613 | A1 | 1/2004 | Rast |
| 2004/0054592 | A1* | 3/2004 | Hernblad ......................... 705/15 |
| 2004/0158494 | A1* | 8/2004 | Suthar .............................. 705/15 |
| 2004/0210621 | A1* | 10/2004 | Antonellis .................... 709/200 |
| 2005/0114185 | A1* | 5/2005 | Rodriguez et al. ................ 705/5 |
| 2007/0077944 | A1 | 4/2007 | Bellenger et al. |
| 2007/0083400 | A1 | 4/2007 | Katz |
| 2007/0250355 | A1 | 10/2007 | Lee et al. |
| 2009/0048878 | A1* | 2/2009 | Metcalf ............................. 705/5 |
| 2009/0124329 | A1* | 5/2009 | Palmisano ..................... 463/20 |
| 2009/0167553 | A1* | 7/2009 | Hong et al. .............. 340/825.29 |

OTHER PUBLICATIONS

Open Table: 24/7 Online Reservations, http://www.opentable.com/info/aboutus.aspx, © 2007, 1 page.

Magellan Reservations Overview, Online Restaurant Reservations and Guest Management/Magellan, http://www.themagellannetwork.cpm/Products, © 2007, 2 pages.

Reservations-GuestBridge, Inc., http://www.guestbridge.com/reserve/reservereservations.html, Downloaded from Internet Apr. 24, 2007. 1 page.

Avenista, Table Reservation Software, http://www.avenista.com/overview.aspx, © 2004, 2 pages.

Restaurant Reservation Software-iMagic Restaurant Reservation, http://www.imagigrestaurantsoftware.com, © 2007, 1 page.

ProHost Seating Management, Products & Services: Seating Management: ProHost, http://www.ntnwireless.com/hospitalityand software/seating_management/prohost.asp, Downloaded from Internet Apr. 24, 2007, 2 pages.

OSR Automations: XSK (kitchen) & Hostess (seating), http://www.qsrautomation.com/products/software/Hostess.asp, © 2007, 2 pages.

QSR Automations, Inc., "With Successful Pilot Implementations OSR Automations Makes Generally Available the ConnectSmart Hostess", http://www.qsrautomation.com/news/press_releases.asp, Downloaded from Internet Apr. 24, 2007, 2 pages.

Restaurant Floor and Table Management Softwore-GuestBridge, Inc., http://guestbridge.com/reserve/reservetablemgmt.html, Downloaded from Internet Apr. 24. 2007, 1 page.

Wait List Management Software-Guestbridge, Inc., http://www.guestbridge.com/reserve/reservewaitlist.html, Downloaded from Internet Apr. 24, 2007, 1 page.

NuRol: Point of Sale and Barcoding, http://www.nurol.com/verticalcategory, Downloaded from Internet Apr. 24, 2007, 3 pages.

Magellan Online Restaurant Reservations and Guest Management Services, http://www.themagellannetwork.com, Downloaded from Internet Sep. 4, 2007, 1 page.

Restaurant Management Software: Restaurant POS Software, Menu Point of Sale System, http://www.capterra.com/restaurant-management-software, Downloaded from Internet Sep. 4, 2007, 12 pages.

* cited by examiner

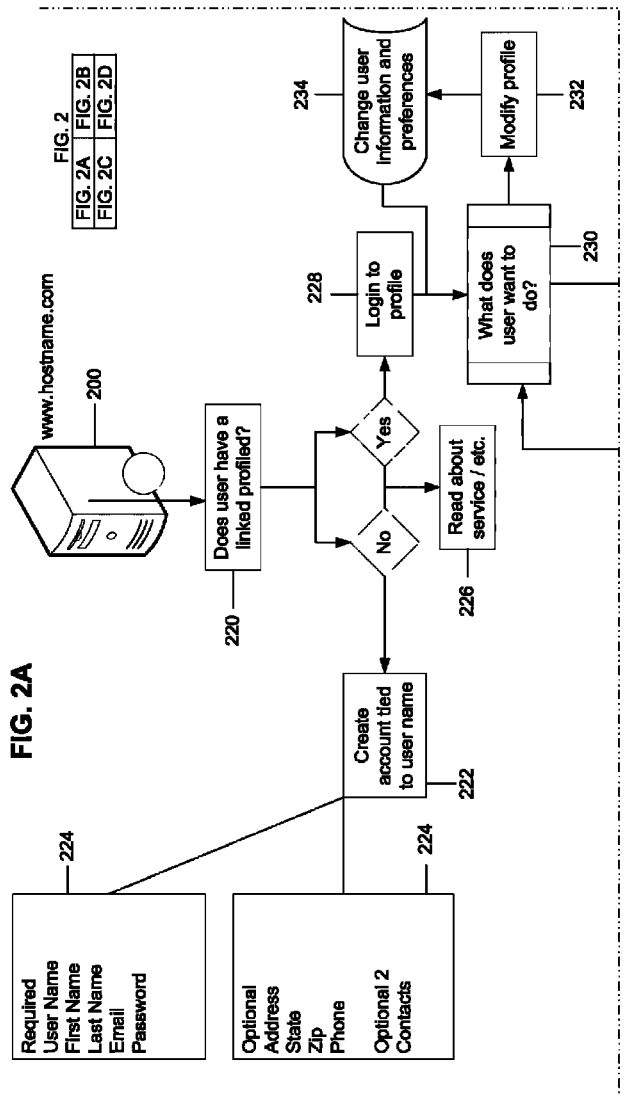

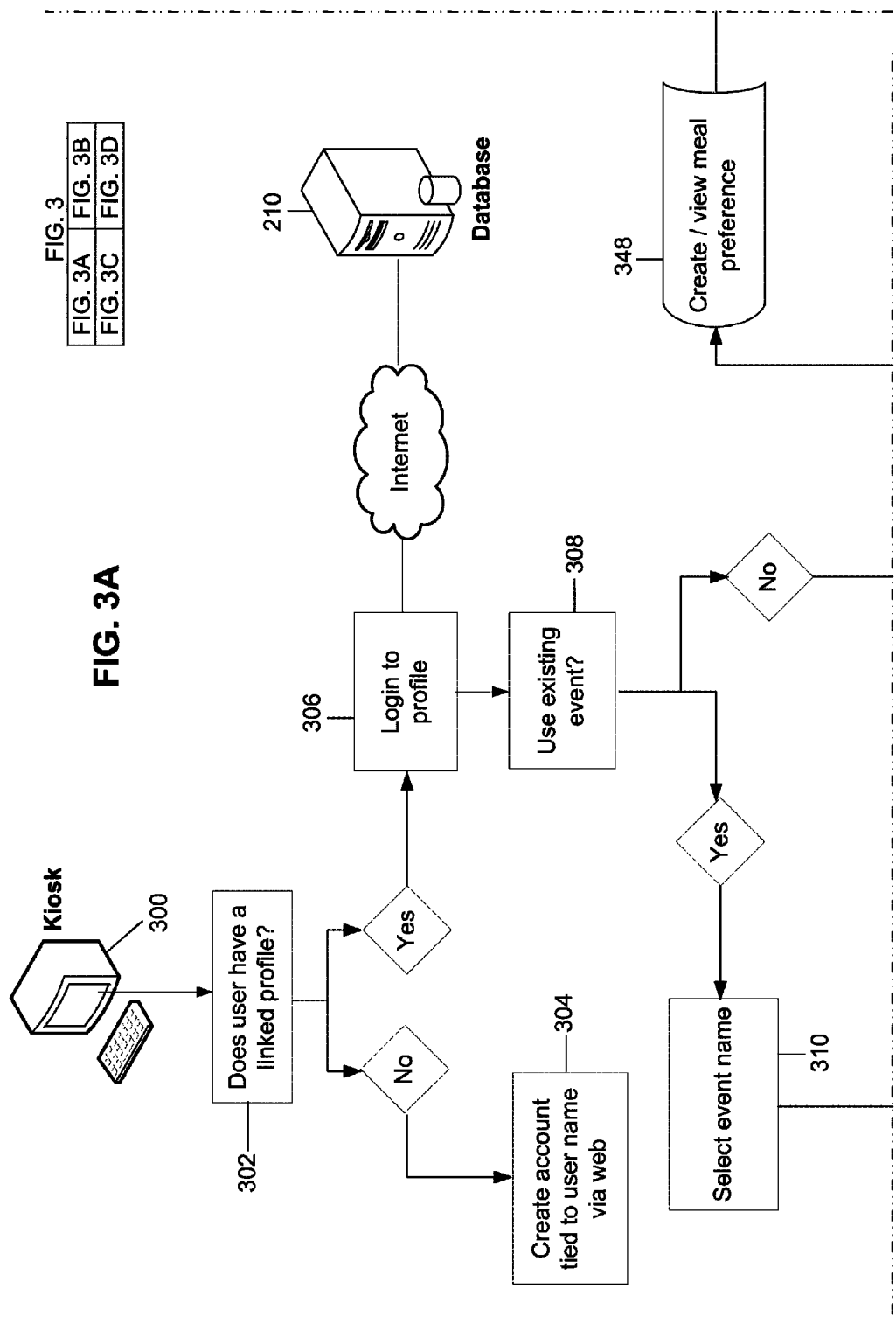

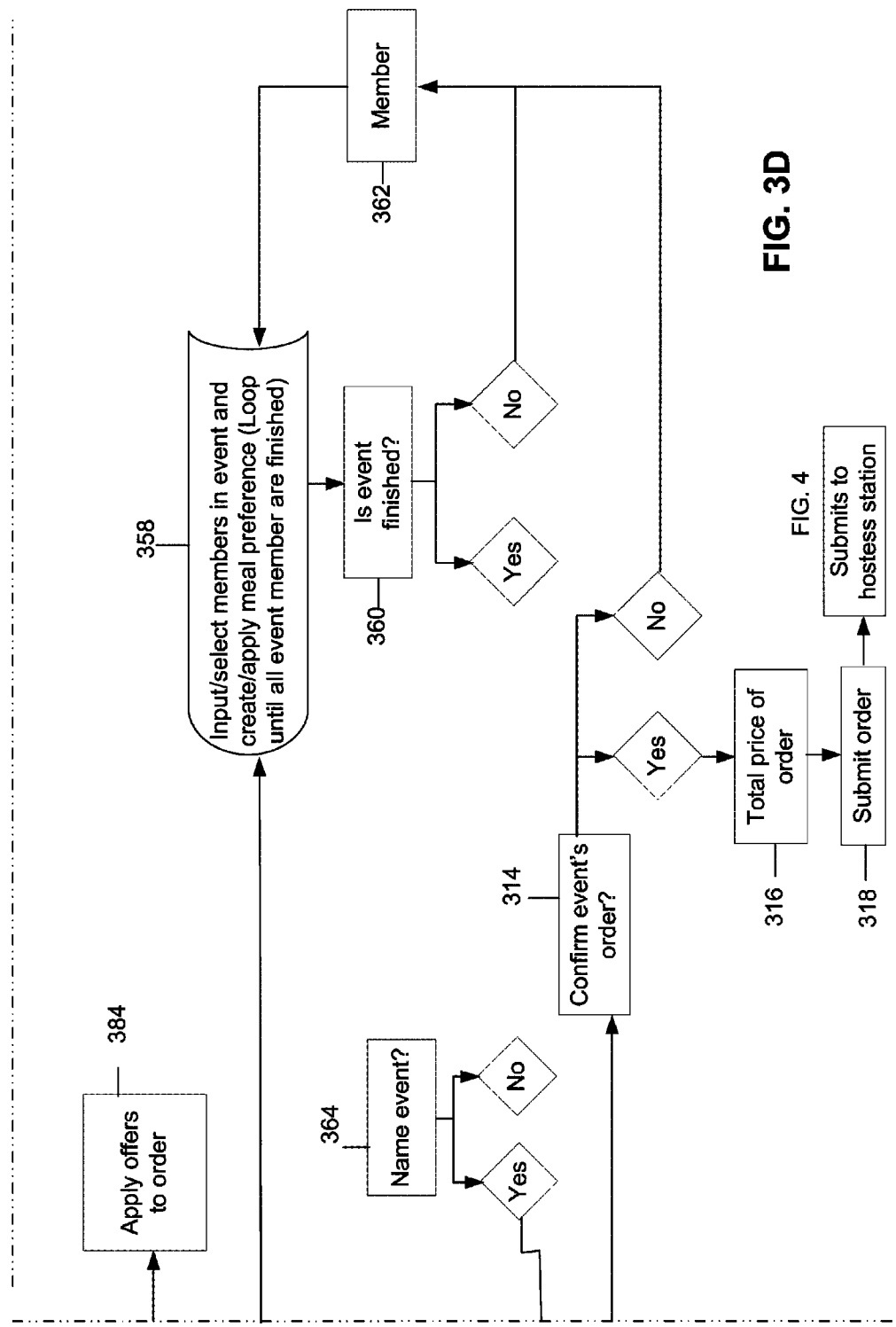

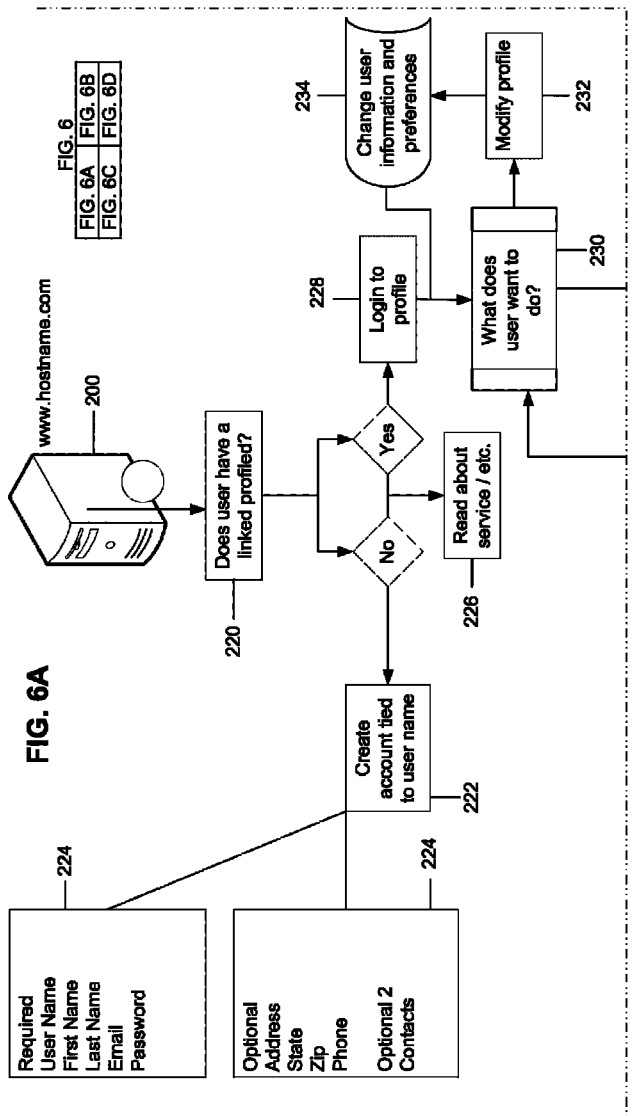

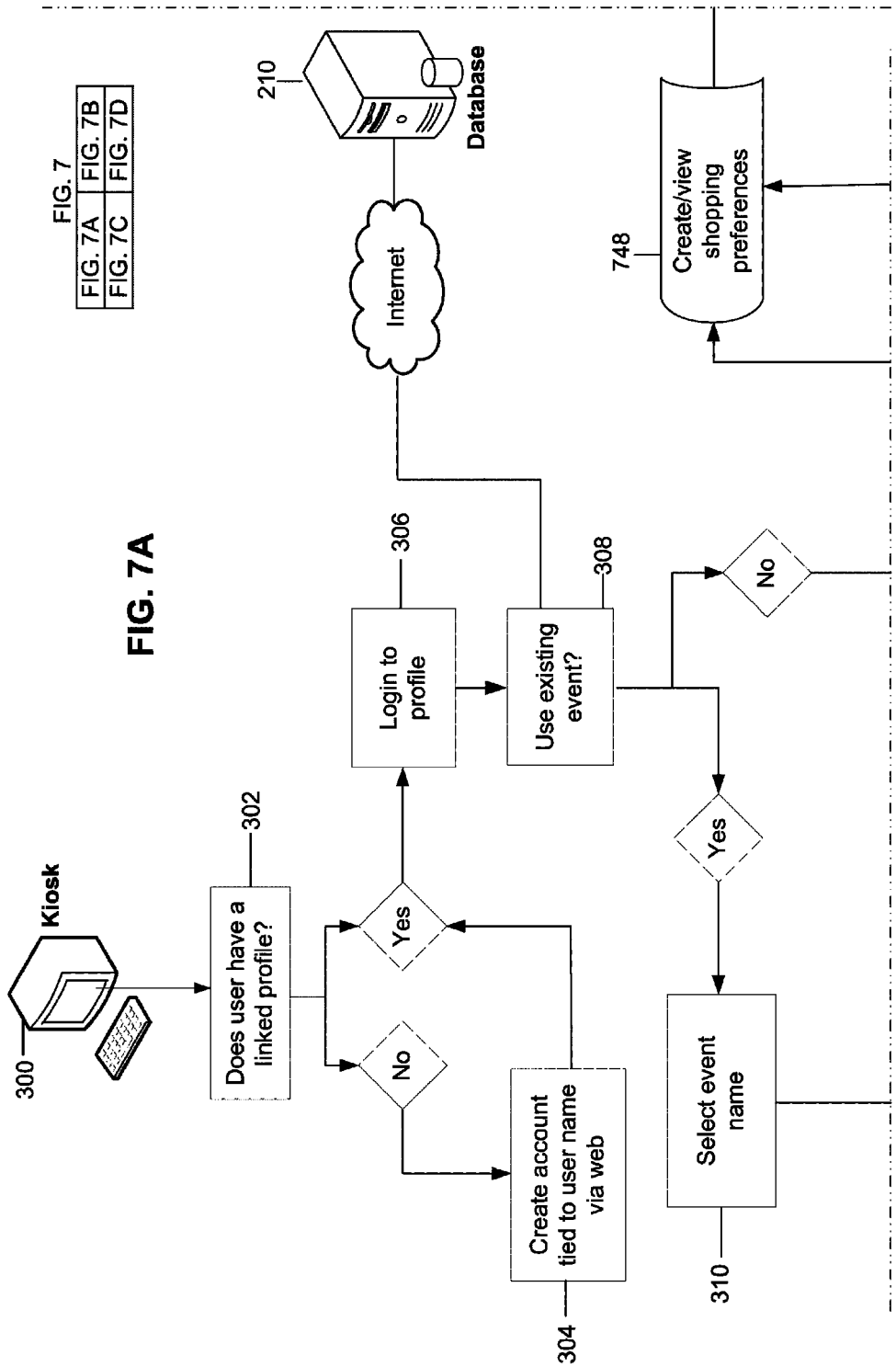

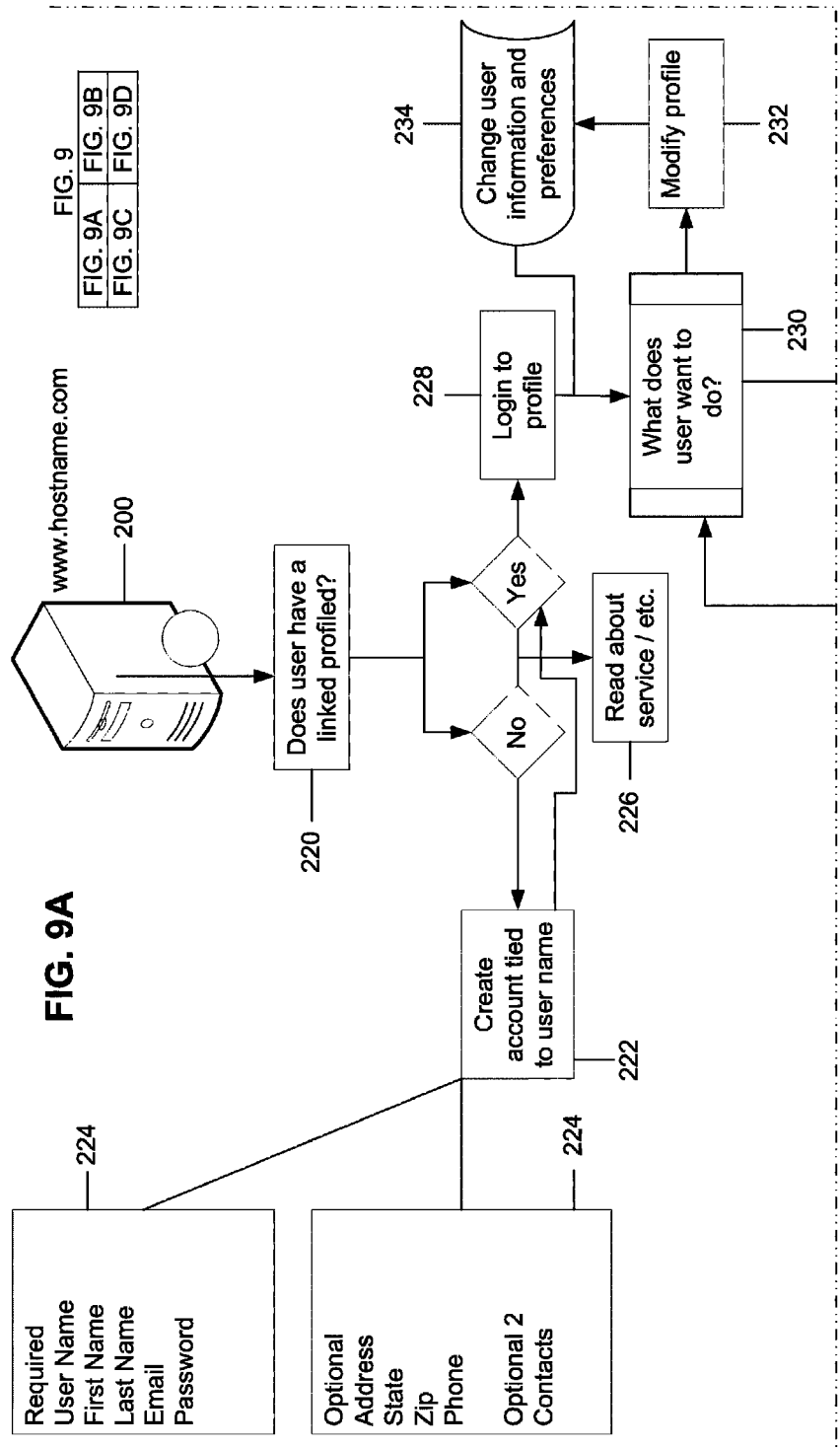

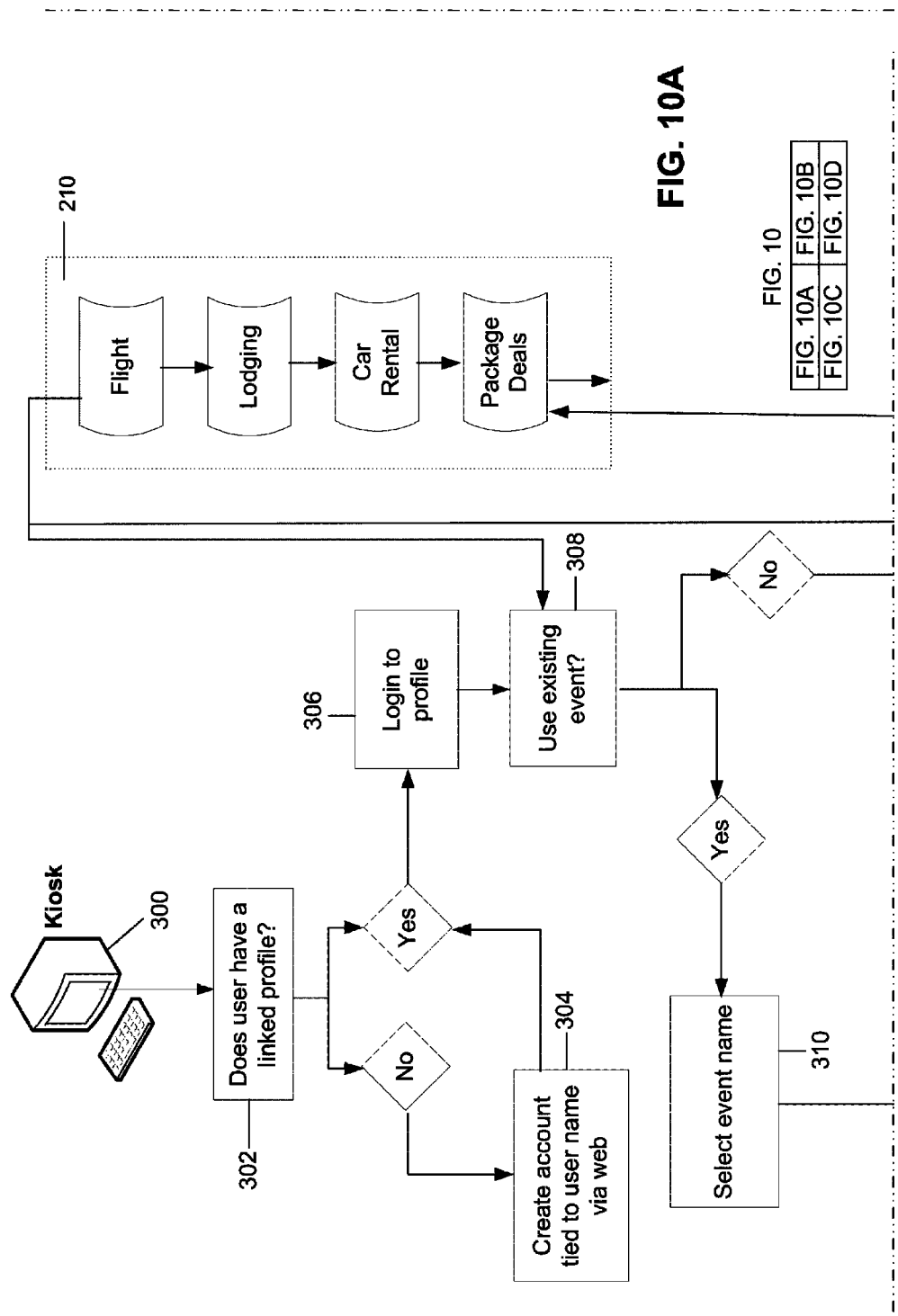

SYSTEM AND METHOD FOR IMPROVING CUSTOMER WAIT TIME, CUSTOMER SERVICE, AND MARKETING EFFICIENCY IN THE RESTAURANT, RETAIL, HOSPITALITY, TRAVEL, AND ENTERTAINMENT INDUSTRIES

CROSS-REFERENCE TO RELATED APPLICATION

This application is a continuation of U.S. patent application Ser. No. 11/741,704 filed Apr. 27, 2007.

TECHNICAL FIELD

The present invention relates to a system and method for improving customer wait time, customer service and marketing efficiency in the restaurant, retail, travel, and entertainment industries and, more particularly, to a system and method including an Internet preordering system accessible online or onsite at free-standing kiosks located in or near client properties in which customers may create profiles for the requested services and provide such information to the service provider in advance of the customer's arrival for the requested services. When the customer arrives, the customer identifies himself/herself and the preorder is accessed, verified and/or modified. The preorder is then forwarded to the service provider and the delivery of the service is optimally timed to the readiness of the customer. The customer's profile and preorder information are maintained in a database and used for in-house precision marketing campaigns and cross-promotional opportunities.

BACKGROUND

Companies in the restaurant, retail, travel, and entertainment industries are constantly seeking new promotions for attracting new customers, moving them through the purchasing process more efficiently, and increasing revenues. Additionally, these entities also constantly seek new ways to improve customer retention. In recent years, technology has been used to implement new ways to attract customers and to create store-specific customer profiles and the like for purposes of improving target marketing. The Internet has facilitated such efforts by enabling data management of the collected customer information.

For example, the Internet has been used to facilitate on-line ordering of pizza through the web sites of several pizza chains. The Internet has also been used to facilitate the placement of customer reservations at eat-in restaurants. See, for example, OpenTable.com, themagellannetwork.com, guestbridge.com, avenista.com, and imagicrestaurantsoftware.com. Additionally, systems have been proposed whereby a customer may access a webpage and choose restaurants by wait time, which is adjusted in real-time.

In addition, a handful of software companies specialize in software solutions for restaurants that allow the restaurants to "turn tables" more efficiently. For example, such systems are provided by ntnwireless.com, qsrautomation.com, guestbridge.com, and nurol.com. However, the solutions offered by such companies are generally limited to seating, scheduling, kitchen management, food presentation, and wait time calculations. Such companies also provide complementary hardware devices such as hostess computer stations, handheld ordering devices that wait staff in restaurants may use to send orders directly back to the kitchen for preparation, and a variety of self-check-in/checkout systems used in grocery and department stores, at airline check-in stations, and the like.

Also, a variety of Internet solutions are available that assist companies in collecting customer data for purposes of direct marketing. However, such information is generally limited to demographic information and purchase information when goods are purchased.

Despite the efficiencies introduced by these systems, much remains to be done to enhance the customer experience when traveling or visiting restaurant, retail, travel, and entertainment establishments. For example, the customer experience is significantly improved when the customer wait time is reduced. Profits of restaurant, retail, travel and entertainment establishments could also be significantly increased by improved customer turnover due to increased efficiencies. Also, shorter wait times would lead to fewer customers being lost during peak times as fewer customers would decide to abandon the wait queue. Thus, a system and method is desired that improves customer service by minimizing customer wait time while also improving accuracy of service requests and marketing efficiency by collecting data relating to customer service preferences for restaurant, retail, travel, and entertainment. The collected data may be used to profile customer purchasing choices for such disparate items as condiment preferences, suit cut, preferences for a baggage handling service, and the like for use in improving marketing efficiencies. The present invention has been designed to meet such needs in the art.

SUMMARY

The present invention addresses the above-mentioned needs in the art by providing a web based and/or kiosk based preordering system and customer management system that, in a restaurant embodiment, interfaces with conventional seating management and/or kitchen management systems to minimize undesirable delay time during a customer's dining experience. In a travel embodiment, the customer's affinities are used to propose travel packages with hotels and restaurants that match the customer's travel affinities. Similarly, in an entertainment embodiment, the customer's entertainment affinities are used to propose entertainment packages that match the customer's entertainment affinities. In a shopping embodiment, a customer may arrange a shopping event where the customer may go to a participating store and have purchase options waiting for review, where such options satisfy the customer's shopping requirements set forth in the shopping event.

In an exemplary embodiment, customers access a web site and create a user profile that is linked to the customer's email address or some other customer identifier. Once registered, the customer is granted access to the menus or other service options of a restaurant or other service providers. In the case of a restaurant, the customer may create menu preferences that may be accessed at any participating restaurant. For example, the common menu of a franchised restaurant chain is provided and the customer creates a customized profile of desirable menu options that may be accessed at any chain of the franchise or at corporate or independently owned stores. The registered customers may also make a reservation at any such participating restaurant for a party of any size in advance (for example, up to 24 hours) of the reservation time. Additionally, the meal order for each guest in the party may be completed in advance and maintained on a server, with the reservation time. When the party arrives at the designated reservation time, the customer accesses the reservation and meal order stored on the server at a kiosk or terminal located at or near the restaurant and connected to the server via the Internet, for example. The customer's identity is verified either by a biometric scan, access card, retinal scan, password, key fob, or the like at the kiosk or terminal. After the verification process, the customer may retrieve the party's meal order, make any desired changes, and then verify the meal order. Once the meal order is verified, the customer may finalize the order and proceed to the hostess kiosk where the meal order is accessed by the restaurant staff. If desired, the meal may be pre-paid or tied to a credit card for later settlement.

Once the meal order is placed, the customer may be entered into a seating management system or placed in a wait queue in the traditional manner. The customer is then immediately seated or asked to wait until an appropriate table is available. Either when the party is seated or at an appropriate time prior to seating (based on a comparison of the seating wait queue to the kitchen wait queue), the meal order is forwarded to the kitchen for meal preparation. The kitchen may or may not also have a computerized kitchen management system into which the order is placed. The timing would be arranged such that the customers received their appetizers, drinks and entrées shortly after being seated.

The system and method of the invention thus save the time for waiting for the customer's orders to be taken and ties the timing of the order fulfillment to the seating of the customer. The customer's wait time is thus reduced and the restaurant's tables are also turned over more efficiently. Also, valuable marketing information, such as what the customer ordered, can be stored and later used to direct market the customer, to adjust menu options, and the like. For example, general discount offers can be sent to all customers who have ordered particular entrées or are likely to order particular entrées. Also, special offers and coupons can be sent to the customer via email and/or accessed by the customer at terminals in the restaurant.

In the exemplary embodiment where the service provider is a restaurant, walk up customers may also be accommodated by the on-site kiosk or customer terminal. If the walk up customer does not have a profile, one can be created that is linked to customer identification information such as a biometric scan, an access card, a retinal scan, a key fob, a password, and the like, that is inputted at the on-site kiosk or customer terminal. Once a customer profile is created, or if the customer already has a profile, the customer can enter the number of people in the party and access the restaurant's menu and enter meal orders for the party. Once the meal order is completed, the same process is followed at the hostess kiosk as in the case of the reservation and meal order placement option via the restaurant's web site as noted above.

The techniques of the invention may also be used to improve efficiencies in other hospitality and entertainment venues. For example, travelers may store their personal profile data such as preferred seat choice, food preference, preferred hotels, preferred car rental agency, preferred check-in process, in a database. The seat choice may include aisle or window, tail or wing, and class sectioning. The database may be mined to identify customers that may be interested in last minute travel deals based on their most frequently or most recently used travel destinations. The last minute opportunities would be provided based on specific preferences set by the customer in the customer's profile. The designated check-in process may include the opportunity for bags to be picked up in advance or mailed via express mail before the travel date and arranged to be delivered to the traveler's hotel room to be waiting for the traveler when the traveler arrives.

Similarly, the customer's entertainment preferences may be maintained in the customer's account with the meal and travel preferences. For example, the customer's movie buying preferences may be maintained so that upon the release of a type of movie preferred by the customer special purchase offers will be sent to the customer based on the customer's profile.

On the other hand, in a shopping embodiment, a customer may arrange a shopping event where the customer may go to a participating store and have purchase options waiting for review. For example, if the customer is planning to shop for clothing, an event is created identifying the type of clothing desired (e.g., a wedding dress), the customer's sizes and affinities, and when the customer is to be expected at the store. The event is forwarded to the store of interest and sample clothing satisfying the event requirements is prearranged for the customer's review upon arrival, thus providing a more efficient shopping experience.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF ILLUSTRATIVE EMBODIMENTS

A detailed description of illustrative embodiments of the present invention will now be described with reference to FIGS. 1-10. Although this description provides a detailed example of possible implementations of the present invention, it should be noted that these details are intended to be exemplary and in no way delimit the scope of the invention.

Computer Environment

Figure 1:
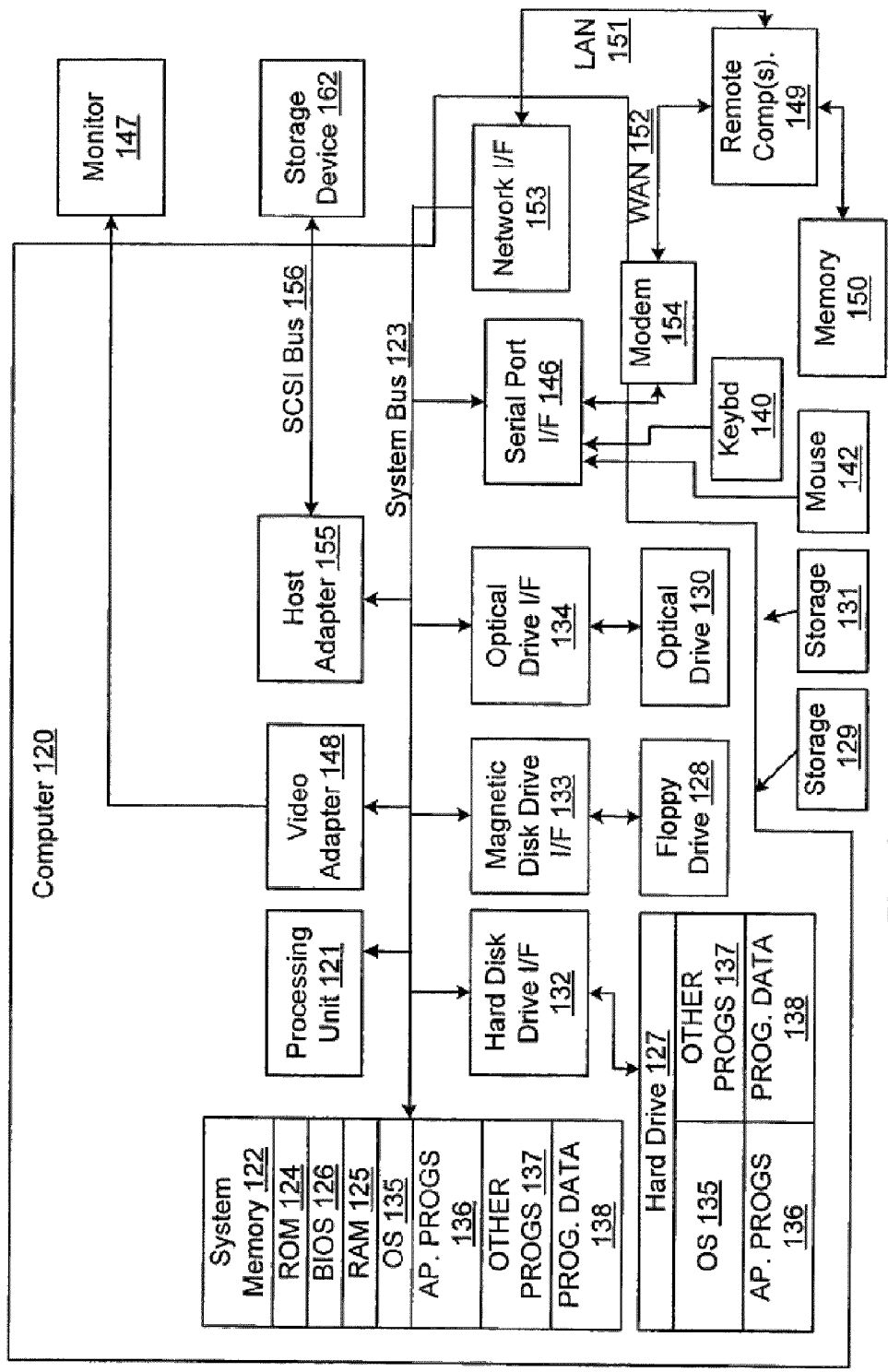
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 is a block diagram representing a general purpose computer system in which aspects of the present invention and/or portions thereof may be incorporated. As shown, the exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video/versatile disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Computer 120 typically includes a variety of computer readable media. Computer readable media can be any available media that can be accessed by computer 120 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 120. Combinations of any of the above should also be included within the scope of computer readable media that may be used to store source code for implementing the flow charts described in detail below.

Web Site Implementation

Figure 2B:
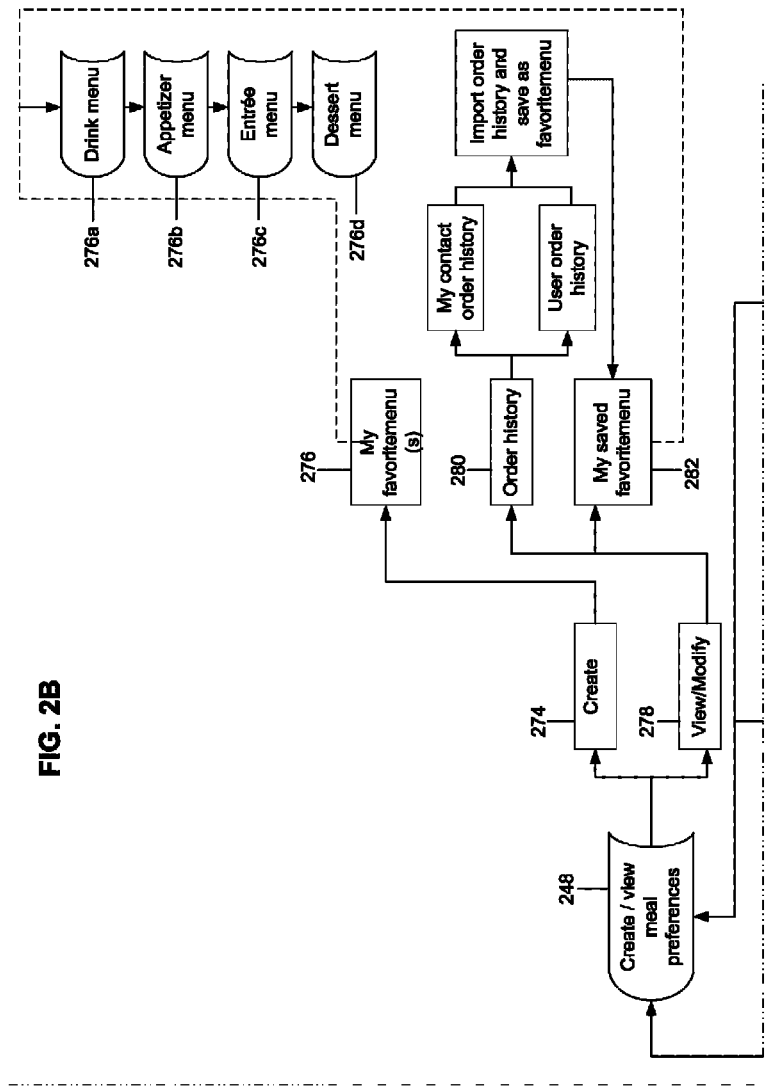
FIG. 2 is a flow diagram showing the process flow through a web site implementing the efficiency system of the invention for preordering food for restaurant dining.
Figure 2C:
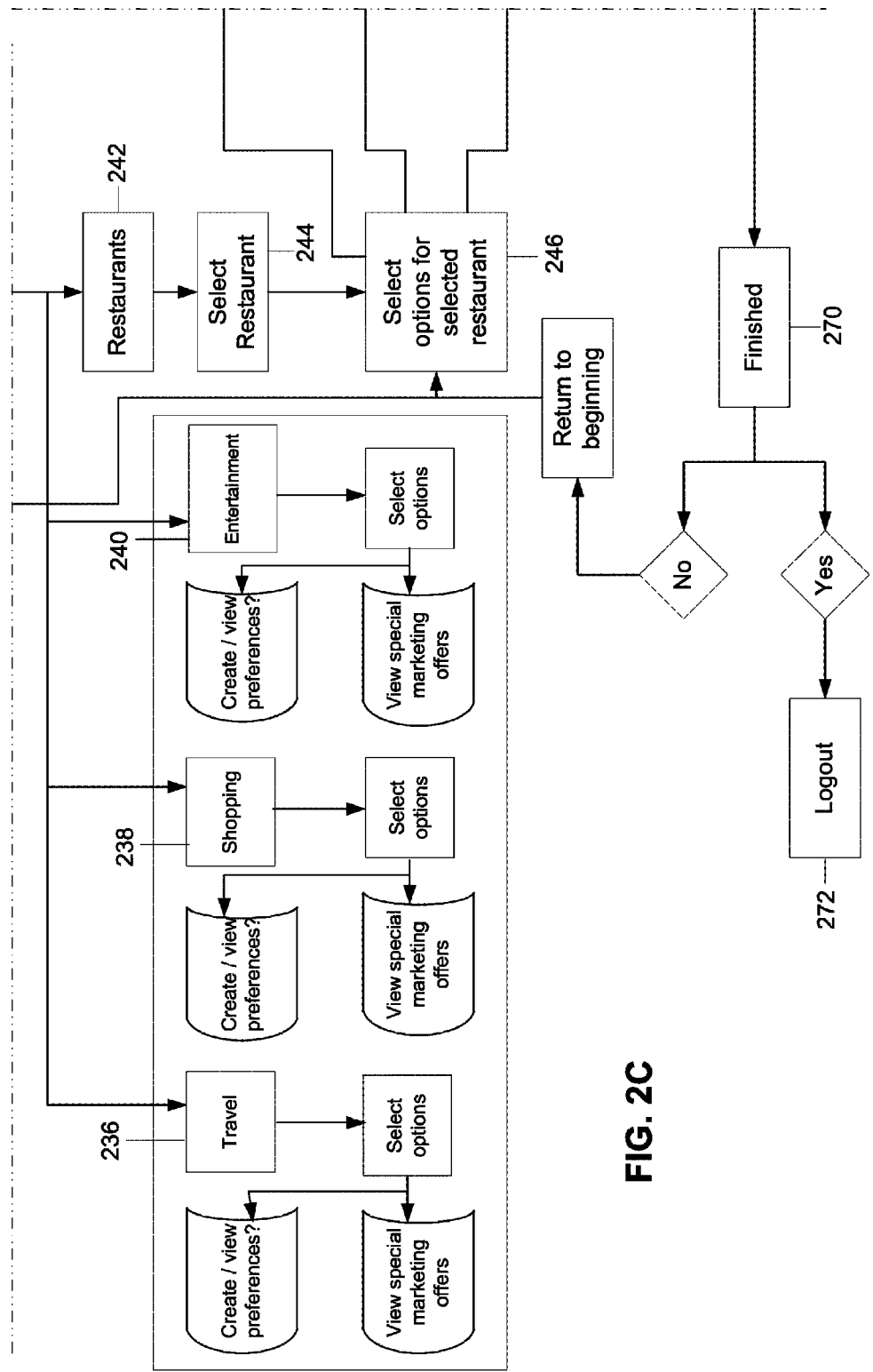
Figure 2D:
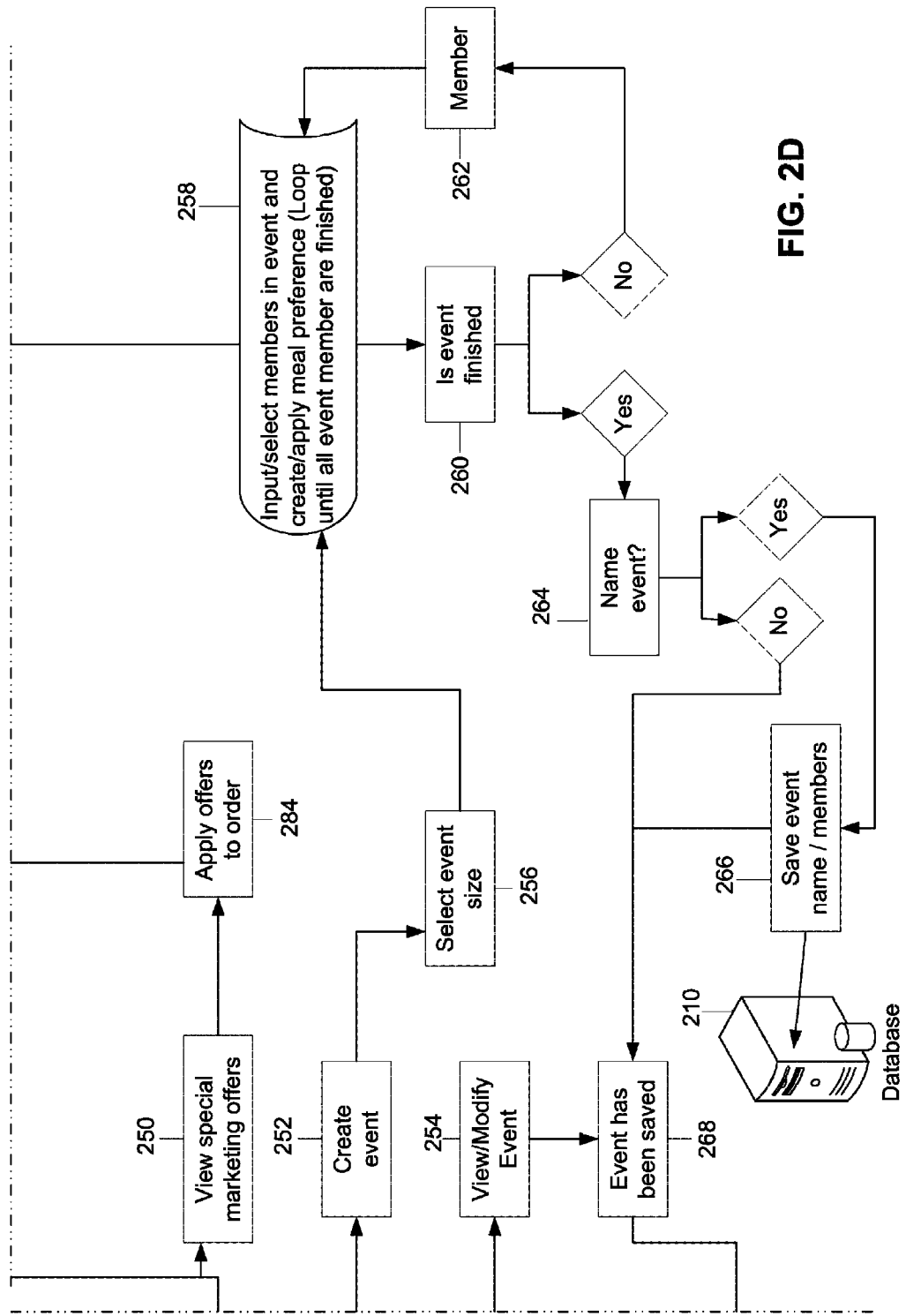

FIG. 2 is a flow diagram showing the process flow through a web site implementing the efficiency system of the invention. As illustrated, the web site is hosted by a server 200 that includes memory for storing the source code for implementing the logic flow as well as a database 210 and a database management system (not shown) for storing and managing the data input by the customer. Server 200 preferably includes a configuration of the type described above with respect to FIG. 1.

As illustrated in FIG. 2, upon accessing the web site, the customer is asked at 220 whether he/she has a linked profile that permits access to information stored in the database 210. If it is the customer's first visit to the web site and/or the customer does not have an account, then at 222 an account is created that is linked, for example, to the customer's email address and other customer identification information 224. The customer identification information may further include identification unique to the customer such as a biometric scan, an access card, a retinal scan, a key fob, a password, an email address, and the like. Once the customer has an account, the customer may chose to read about services offered through the web site (226) or chose to login to the customer's account at 228 to access the customer's profile (if one has already been created). The customer is presented with options at 230, including modifying the customer's profile at 232. If the customer opts to modify his/her profile, then the new customer information and preferences are stored at 234.

At 230, the customer also may choose to access at least one of the following options: travel 236, shopping 238, entertainment 240, and restaurants 242. In each instance, the customer is allowed to select one or more of a variety of options, to view special marketing offers generated from the customer's data, and to create and/or view the customer's preferences. The restaurant option 242 will be described in more detail herein as an exemplary embodiment and some additional description of travel option 236, shopping option 238, and entertainment option 240 will also be described below. Those skilled in the art will appreciate that, in each instance, the customer is given the option of saving a profile that is used to improve the efficiency of the customer's use of the available service and that the saved profile may be used for efficient direct marketing of the customer.

In the case of using customer profiles to improve the efficiency of a restaurant experience, the customer selects an available restaurant at 244. An "available" restaurant is a restaurant that implements the system of the invention and makes its menu available to the customer via the web site described in FIG. 2. The customer then selects the available options at 246 for the selected restaurant. For example, the customer may create or view meal preferences at 248, view special marketing offers at 250, create an event at 252, or modify an event at 254.

If the customer opts to create an event at 252, the customer selects an event size at 256. For example, the customer may select the proposed date and time for the event for a designated number of people using a conventional reservation system (as available). If a conventional reservation system is not used by the selected restaurant, then only the party size needs to be inputted at 256. Once the date and time of arrival is determined (as available) and the size of the party is provided at 256, the members of the party are input by name (or other identifier) at 258 and a meal preference for each member is selected from the restaurant's menu and inputted into the event record for each member (258, 260, 262). The process continues until all selections have been made and the event is given a name at 264 and saved in database 210 at 266.

Once the event is saved (268), the customer may choose to view or modify the event at 254. Once the event creation/modification is complete at 270, the customer may logout at 272 or return to 230 or 246 to make a further selection.

When creating a meal preference at 258, 260 and 262 for each member of the party, each customer may order for each member of the party an appetizer from the appetizer menu, a drink from a drink menu, an entrée from an entrée menu, a dessert from a dessert menu, and the like, before confirming the meal order and moving on to the next member of the party. The other party members may be processed as "guests" of the customer with the account, or if other party members also have accounts, they may access or create their own profile and tie it to the event. Each party member may identify himself/herself using biometric data, an access card, a retinal scan, a key fob, a password, an email address and the like, or the member may simply be tied to the identification for the customer who created the event. Each customer with an account may also retrieve a saved profile, saved favorites or recent orders and may be allowed to view special marketing offers (coupons) and the like.

On the other hand, if a customer elects to create or view meal preferences at 248, a meal preference profile is created at 272 for the customer for the selected restaurant and stored as the customer's "favorite menu" 276, including favorite drinks 276a, favorite appetizers 276b, favorite entrées 276c, and favorite desserts 276d. If the customer opts to view or modify his/her meal preference profile at 278, then the customer may view his/her order history 280 and modify and/or save the order history as the customer's favorite menu at 282. The menu items 276a, 276b, 276c and 276d would be updated accordingly.

Finally, if the customer opts to view marketing offers at 250, any applicable offers may be applied to the event and/or meal preferences at 284.

Figure 3B:
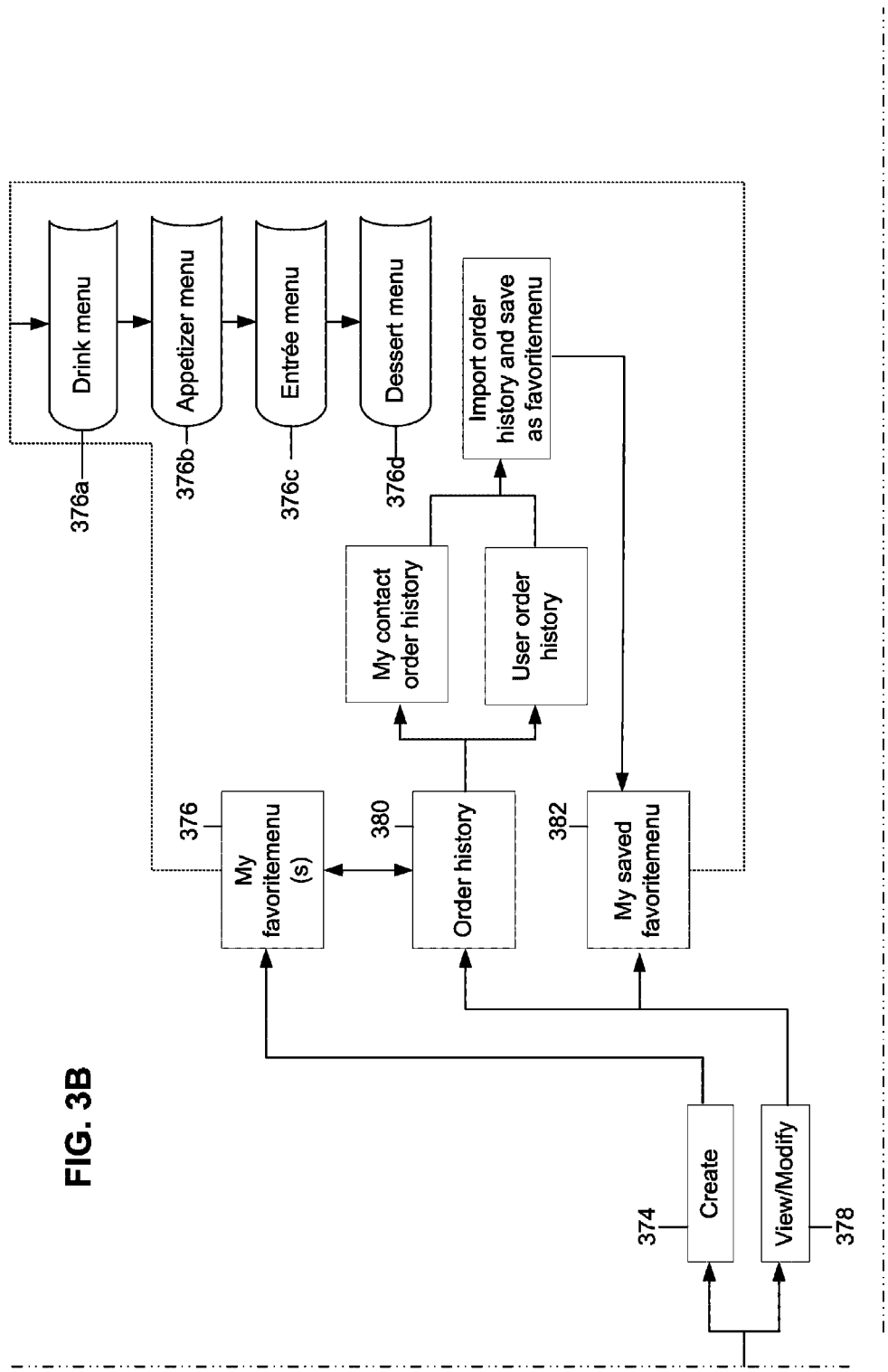
FIG. 3 is a flow diagram showing the process flow through a kiosk or customer terminal available on-site at a restaurant to create and/or access the customer's profile and preorder data.
Figure 3C:
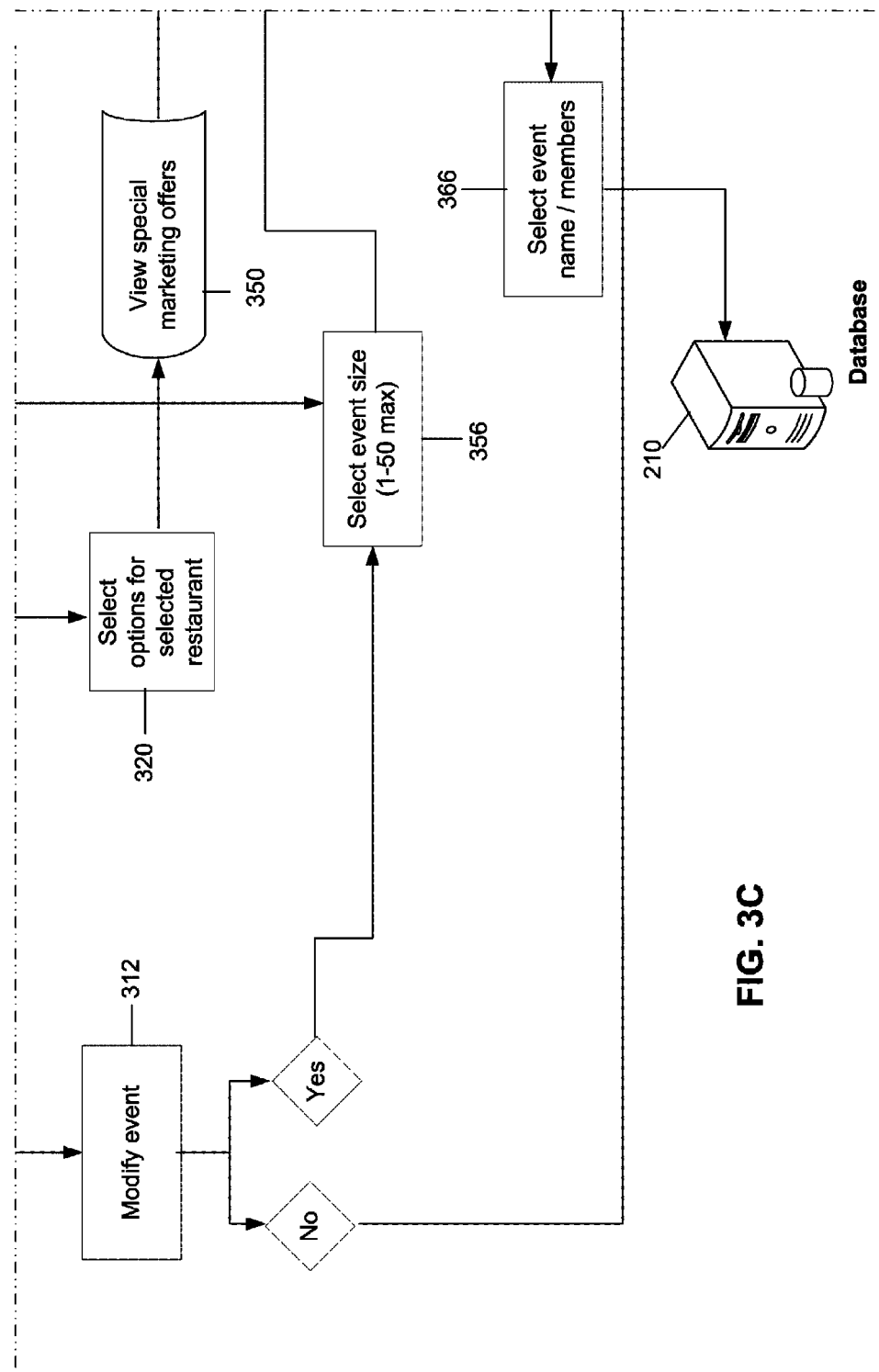
Figure 4A:
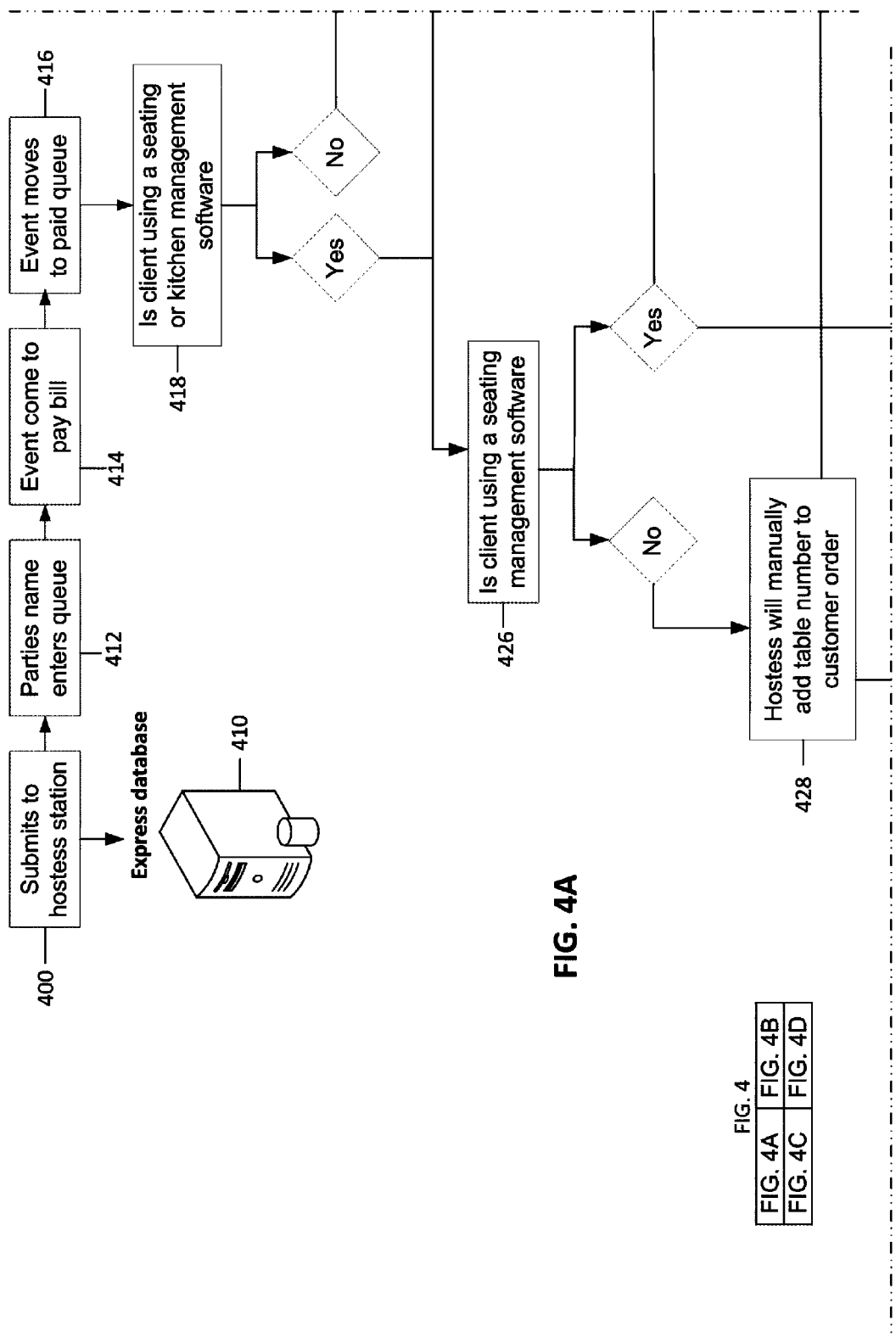
FIG. 4 is a flow diagram illustrating the interaction of the process of the embodiment of FIGS. 2 and 3 with seating management systems and kitchen management systems.
Figure 4B:
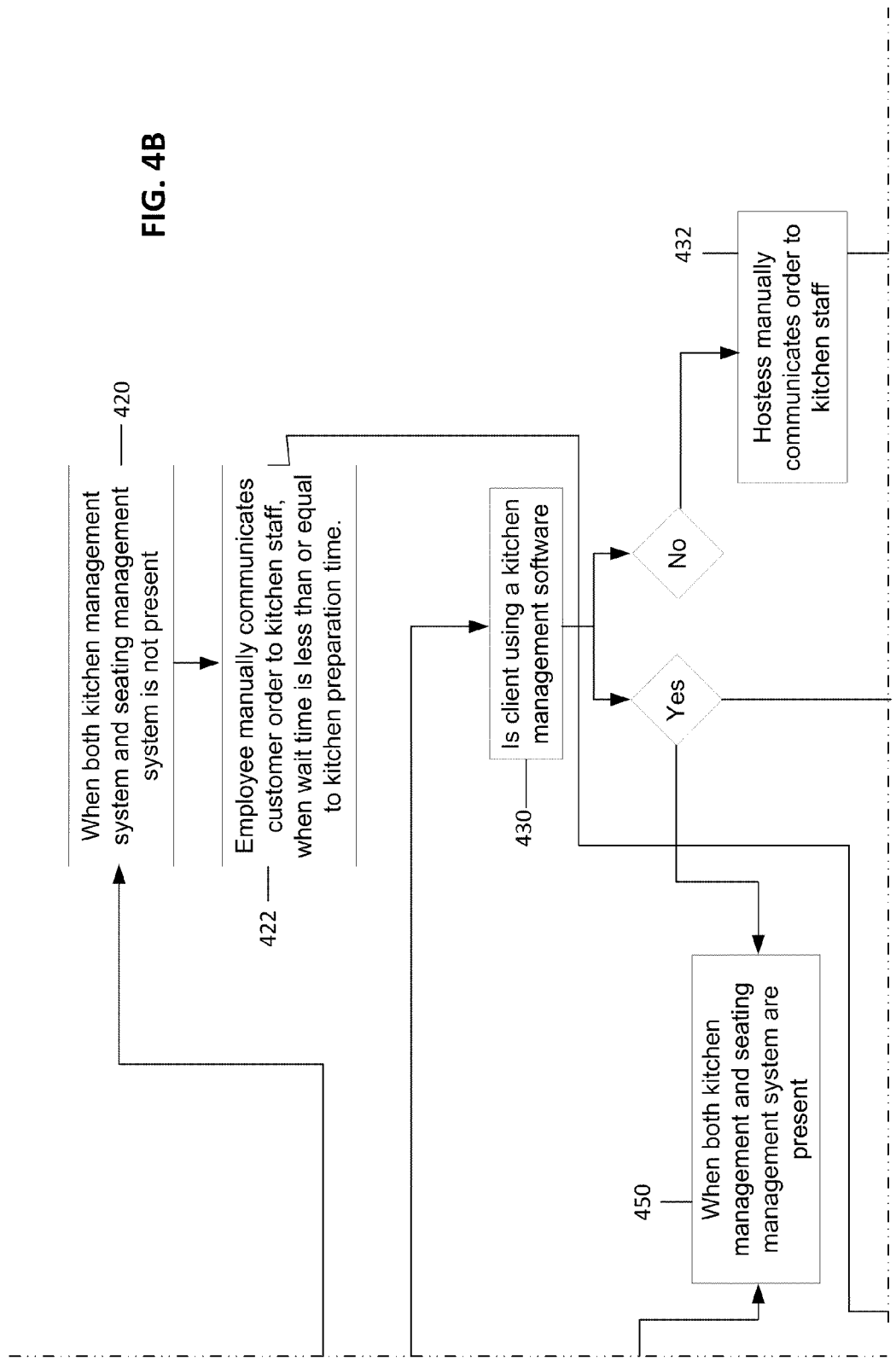
Figure 4C:
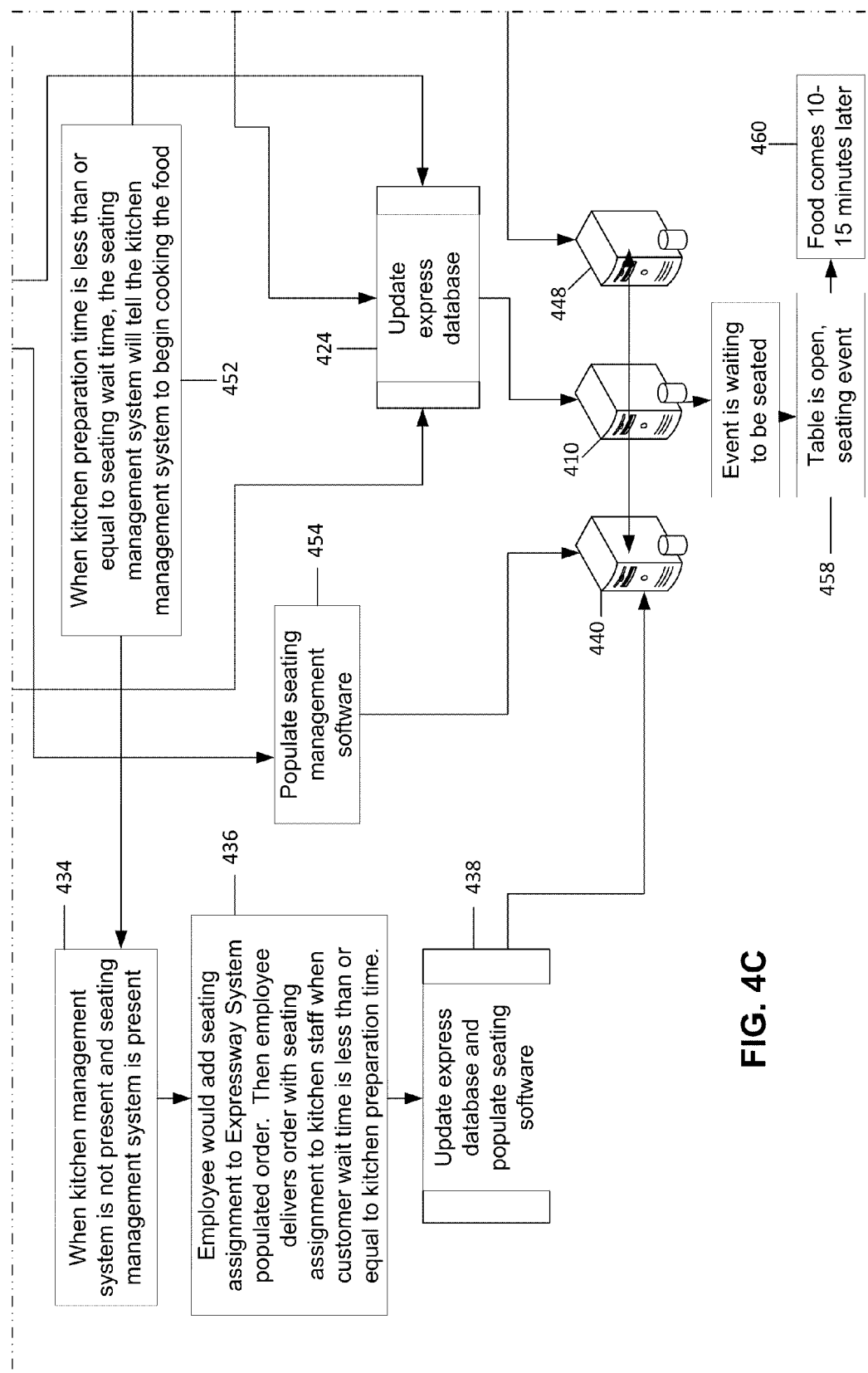
Figure 4D:
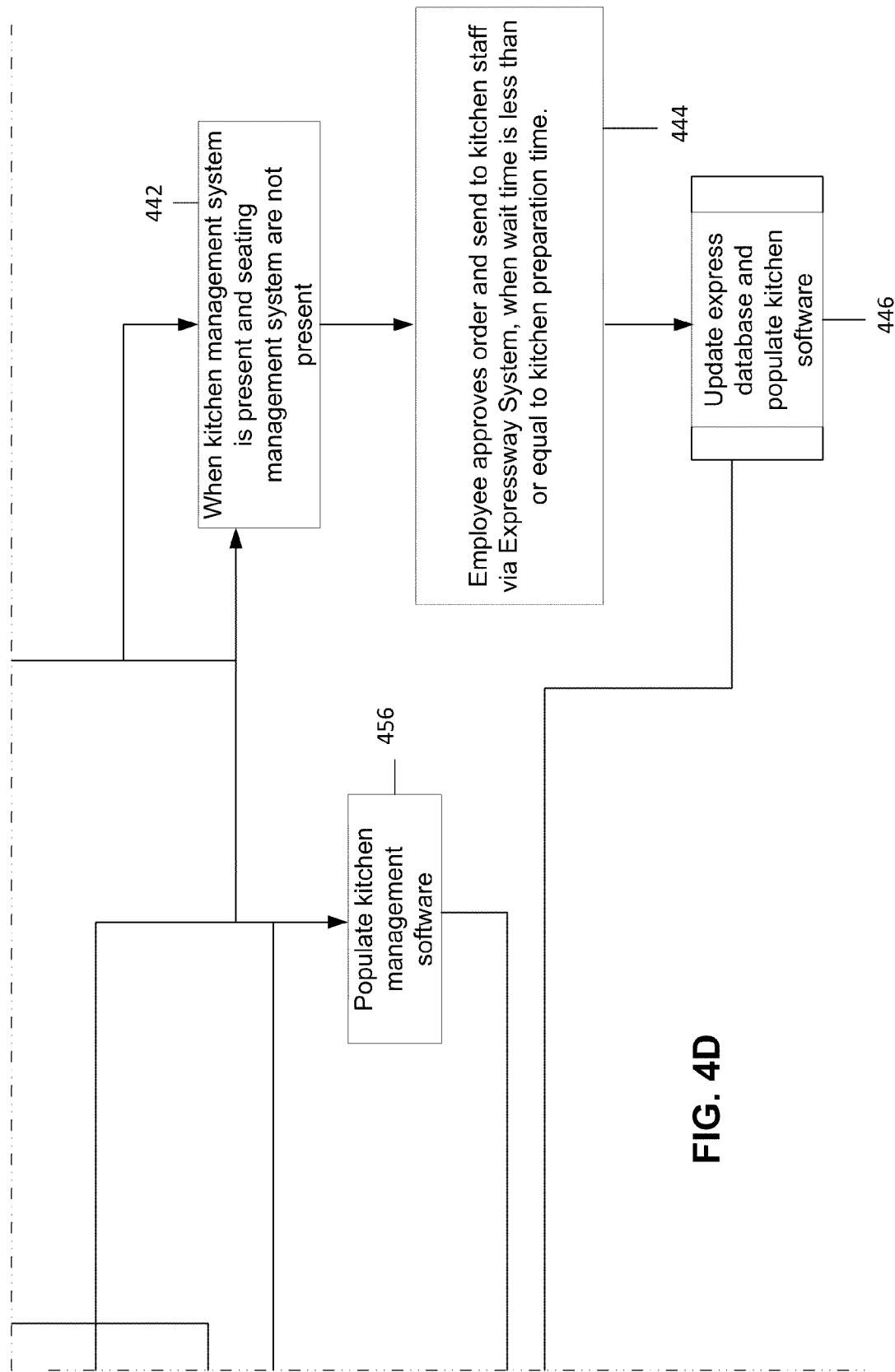

All of the above information is stored in database 210 for access by the customer and for providing to the restaurant upon entry as will be explained below with respect to FIGS. 3 and 4.

Kiosk Implementation

The method of the invention may be implemented with or without the availability of a menu through a web site as described above with respect to FIG. 2. Whether or not the system includes the web site described with respect to FIG. 2, a kiosk or other customer terminal 300 is provided at or near the restaurant. The kiosk 300 is programmed with source code that implements the functionality illustrated in the flow diagram of FIG. 3, which shows how the customer may create and/or access and/or modify the customer's profile and order data. In an exemplary embodiment, the kiosk 300 includes a touch screen to facilitate customer data entry. Also, the kiosk 300 preferably includes a configuration of the type described above with respect to FIG. 1.

In accordance with the method of the invention, upon entering the restaurant implementing the system of the invention, the customer approaches kiosk 300. The customer is asked at 302 whether he/she has a profile linked to unique identifying information that permits access to information stored in the database 210. If it is the customer's first visit to the web site and/or the customer does not have an account, then at 304 an account is created that is linked, for example, to the customer's email address and other customer identification information as described above with respect to 224. The customer logs in at 306 by providing appropriate biometric identification data, password, access card, retinal scan, key fob, or the like and accesses his/her profile stored in database 210 via an Internet or other network connection. If an event has already been created and stored (for example, via the web site as described above with respect to FIG. 2), the customer is given the option to access the existing event at 308. If an existing event is to be selected, it is selected by name at 310, modified as appropriate at 312 (for example, guest may be added or subtracted and meals may be modified), and the event order is confirmed at 314. For example, to confirm the event, the customer may simply select a confirmation option on the kiosk interface or, conversely, confirmation may not be permitted until all members of the party have been identified to the system using the biometric data or some other unique identification of each member. If not ready to complete the order confirmation for any reason (e.g., all members of the party are not yet present), the customer may be asked to return when ready to proceed. Note that it is important in accordance with the invention to not proceed until all members are present as confirmation of the order may create an obligation to pay for the ordered items. Once the event is confirmed at 314, the total price of the order may be calculated at 316 and submitted to the hostess station at 318 for processing in accordance with the flow of FIG. 4.

On the other hand, if no existing event has been created or if the customer wishes to modify the event or create a new event, the customer is presented with the available options for the selected restaurant at 320. The options are generally the same as those described above with respect to FIG. 3 and thus have been given similar reference labels (for example, 348 corresponds to 248 and the like). Once completed, the event is confirmed at 314 and passed to the hostess station (FIG. 4).

Hostess Kiosk

FIG. 4 is a flow diagram illustrating the interaction of the process of the invention with seating management systems and kitchen management systems that may be employed by the restaurant. In other words, the underlying software accommodates use in hostess stations that are connected to kitchen management software, seating management software, neither software package, or both. As illustrated, the event is submitted to the hostess station 400, which includes a hostess kiosk of the type available, for example, from kiosk.com. The hostess station 400 may be connected to the kiosk 300 in a local area network, by direct connection, via the Internet, or any other communication device known to those skilled in the art. Also, the hostess station 400 may include a local or remote database 410 that cooperates, as appropriate, with conventional seating management and/or kitchen management software to manage the customer seating and meal preparation based on the meals ordered in the event. Hostess station 400 also preferably includes a computer configuration of the type described above with respect to FIG. 1.

Upon receipt of the event at the hostess station 400, the event (by party name) enters a seating queue at 412. Optionally, the invoice for the order may be paid in advance at 414, or a credit card may be provided to hold the event upon until settlement at the end of the meal. Once the event has been paid or the credit card has been swiped (or if such options are not desired) at 416, the software loaded into the hostess station works in one of several ways depending upon whether the restaurant implement a seating management system, a kitchen management system, neither, or both as determined at 418. As illustrated, if neither system is used (420), the restaurant employee (e.g., hostess) manually communicates the customer order (event) to the kitchen staff once the projected wait time for seating is less than or equal to the kitchen preparation time (422). The database 410 is updated accordingly at 424. Similarly, if it is determined at 426 that no seating management software is being used, then the hostess manually adds the table number to the customer order at 428 and the database 410 is updated at 424, and if it is determined at 430 that no kitchen management software is being used, then the hostess manually communicates the customer order (event) to the kitchen staff at 432 and the database 410 is updated at 424.

On the other hand, if it is determined at 426 that seating management software is being used and at 434 that no kitchen management software is being used, the employee adds a seating assignment to the populated order at 436 and delivers the order with a seating assignment to the kitchen staff when the customer wait time is less than or equal to the kitchen preparation time. At 438, the seating management database 440 and database 410 are updated. Similarly, if it is determined at 430 that kitchen management software is being used and at 442 that no seating management software is being used, the employee approves the order and sends the order at 444 to the kitchen staff when the customer wait time is less than or equal to the kitchen preparation time. At 446, the kitchen management database 448 and database 410 are updated.

Finally, if it is determined at 450 that the restaurant has a kitchen management system and a seating management system, then at 452 the seating management system will automatically tell the kitchen management system to begin cooking the food as soon as the kitchen preparation time is less than or equal to the seating wait time. The seating management software 440 and kitchen management software 448 then are appropriately updated at 454 and 456, respectively.

Once the table for the party is ready at 458, the party is seated and the food (which has already been ordered and the order placed with the kitchen staff) arrives a few minutes later (460).

Method of Use of the System of FIGS. 1-4

Those skilled in the art will appreciate that the system described above with respect to FIGS. 1-4 affords a customer with an account the option of registering an order in advance using the account via the web site (FIG. 2) so long as the restaurant is one of those available to the customer via the system. Optionally, the customer may walk in and access a kiosk or customer terminal (FIG. 3) that affords the customer the opportunity to create a preorder that is ready to submit just before or at the time the customer is seated. In either case, when the customer arrives at the hostess kiosk (FIG. 4), he/she/they may approve and pay for the order or swipe a credit card to open a payment account that is settled at the end of the meal. A touch screen beside or as part of the hostess kiosk 400 may be provided for this purpose. Of course, customers may also pay in the traditional manner. The preorder is then submitted to the kitchen at a time when the wait time is less than or equal to the kitchen preparation time. In any event, it is contemplated that the order is submitted by the time the customer's party is seated.

Figure 5A:
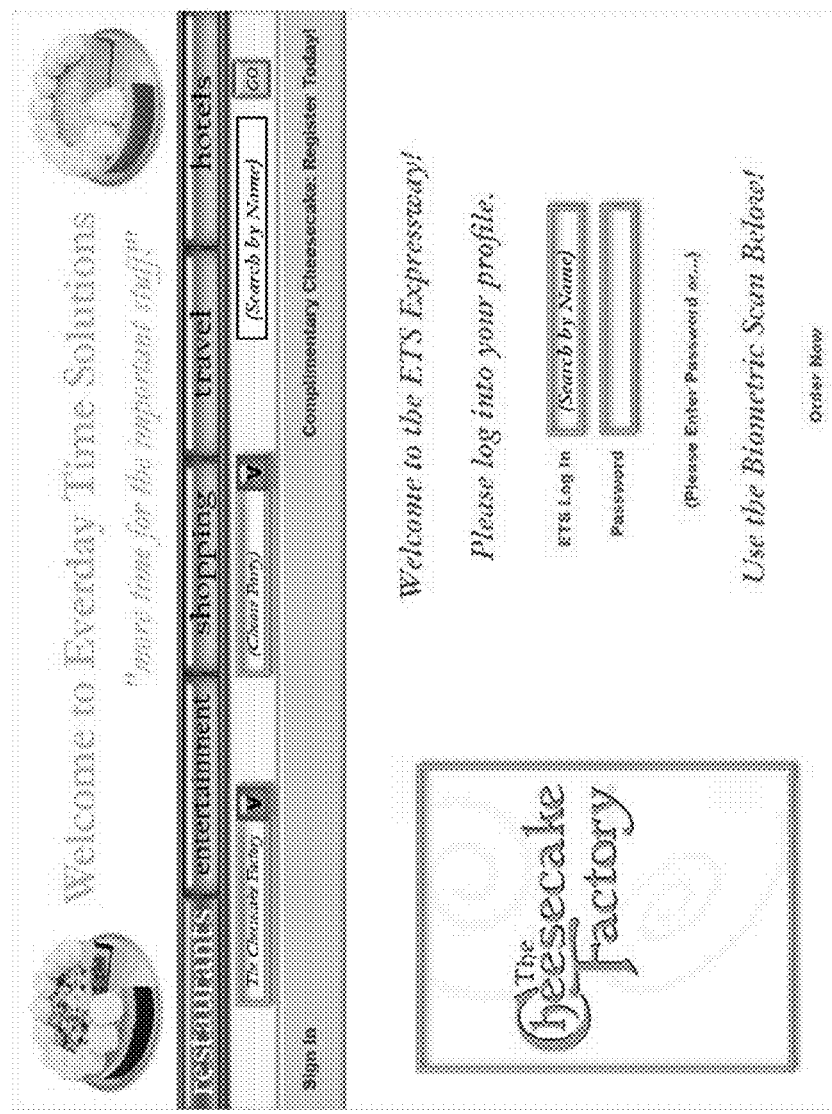
FIGS. 5A-5G illustrate sample screen shots that may be presented to a customer at a kiosk when accessing the system of the invention.
Figure 5A:
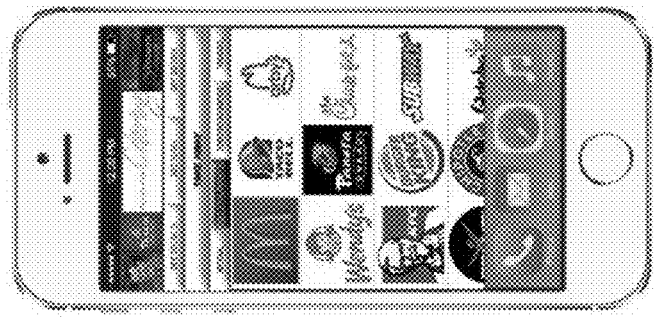
Figure 5B:
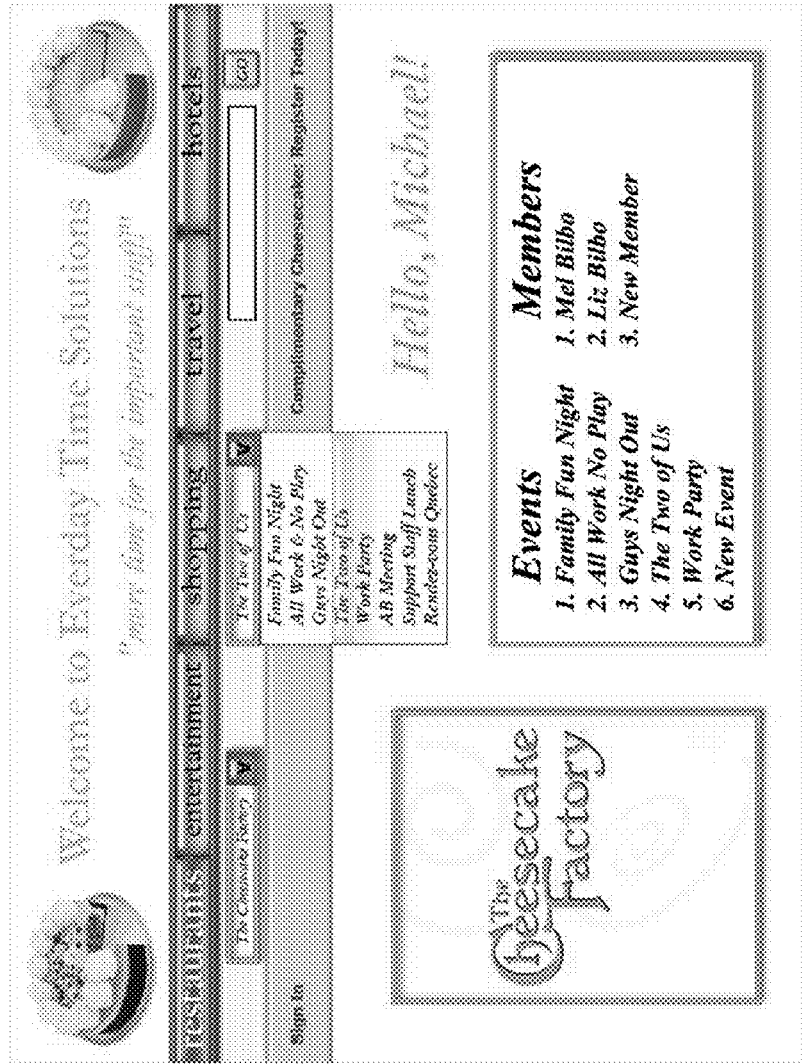
Figure 5B:
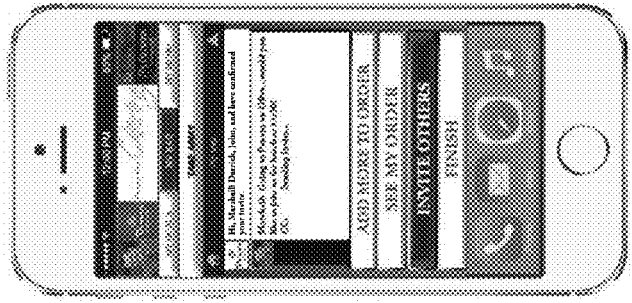
Figure 5C:
Figure 5C:
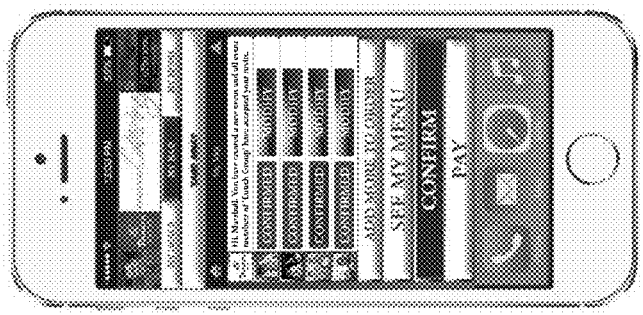
Figure 5D:
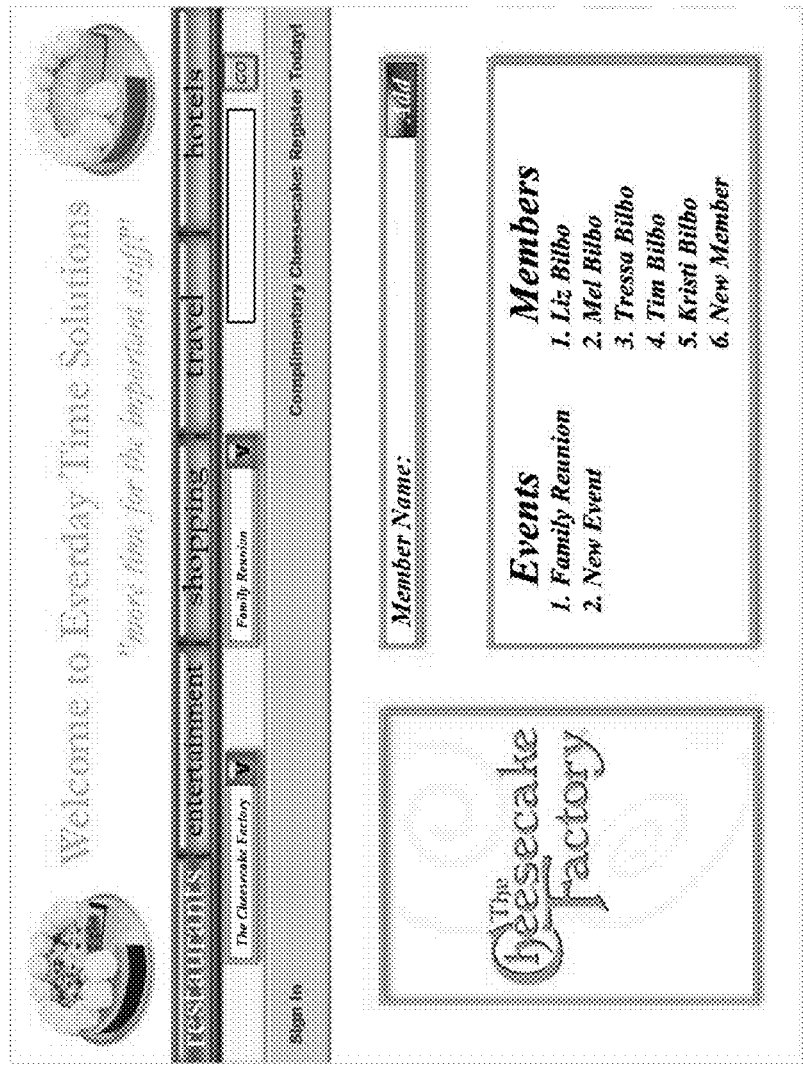
Figure 5D:
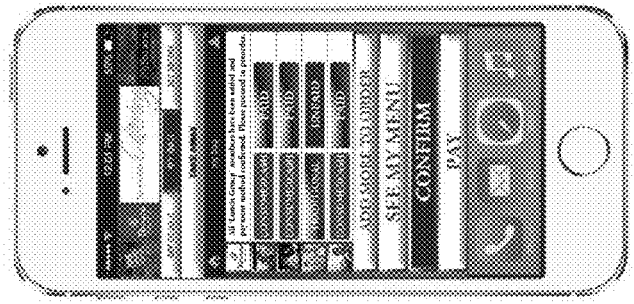
Figure 5E:
Figure 5E:
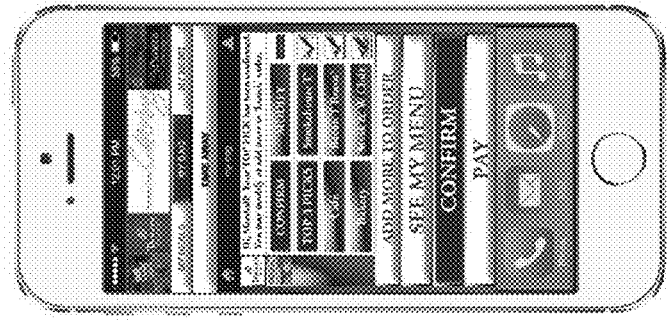
Figure 5F:
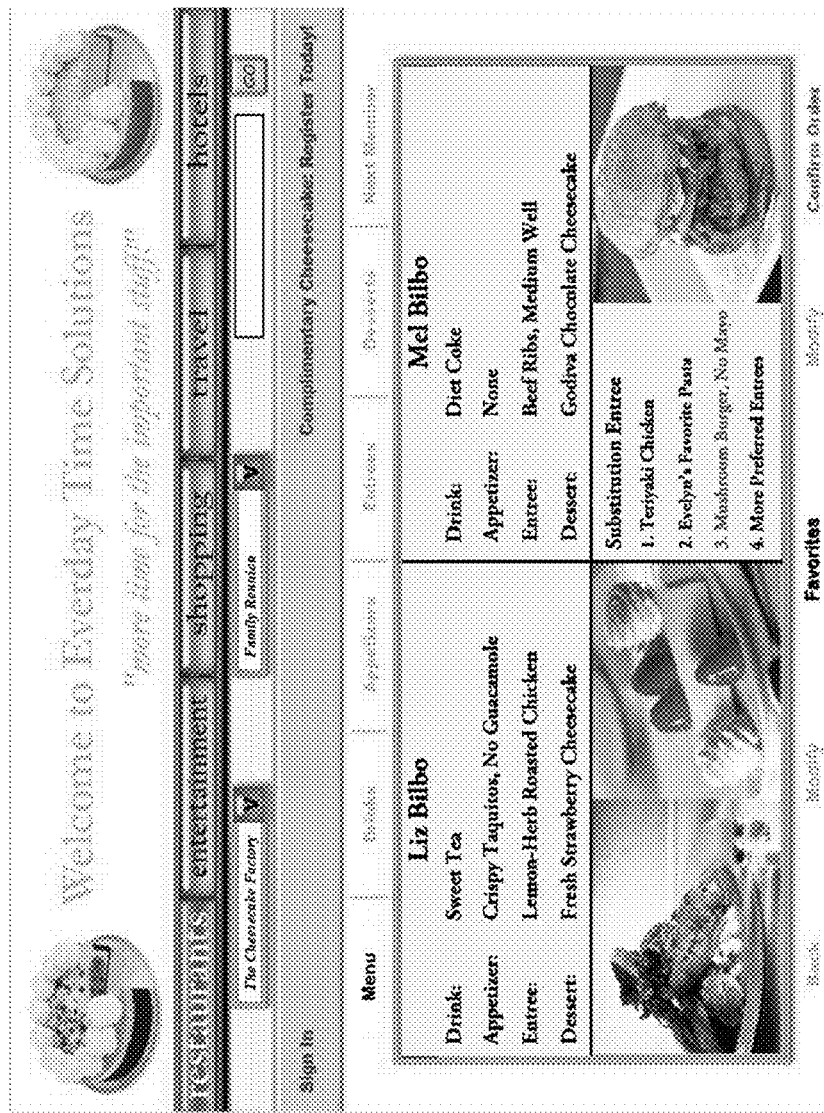
Figure 5F:
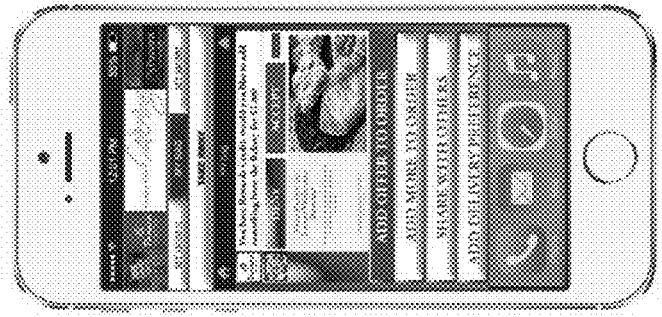
Figure 5G:
Figure 5G:
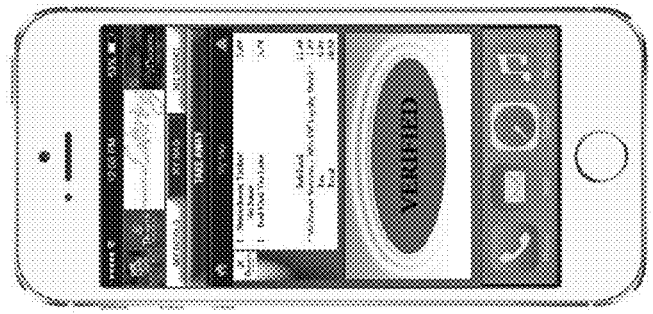

FIGS. 5A-5G illustrate sample screen shots that may be presented to a customer when accessing the kiosk 300. In FIG. 5A, the customer is given the option of creating a profile or selecting a profile. In FIG. 5A, the customer already has a profile so the customer is asked to input his/her profile name and password. As shown in FIG. 5B, the customer (Bilbo) is identified and is asked to select one of the indicated events or to create a new event. In FIG. 5C, the customer (Bilbo) elects to create a new event. In FIG. 5D, the new event (Family Reunion) is created by inputting the guest names. In FIG. 5E, the guest (Mel Bilbo) is asked to select his meal options. In this case, Mel may choose from the menu options at the top of the page or from his favorites (from his stored profile) listed at the bottom of the page. This process repeats for all guests until an order is completed as shown in FIG. 5F. As also shown in FIG. 5F, guest Mel has elected to substitute a sirloin for his burger. Once the order is confirmed, an order confirmation page (in this case requesting payment) is generated as shown at FIG. 5G. A similar presentation may also be made through the web site when generating an event order pursuant to the flow of FIG. 2.

Other Embodiments

As noted above with respect to FIG. 2, the efficiency system of the invention may also be used to improve shopping, travel, and entertainment access by the customer.

Shopping

Figure 6B:
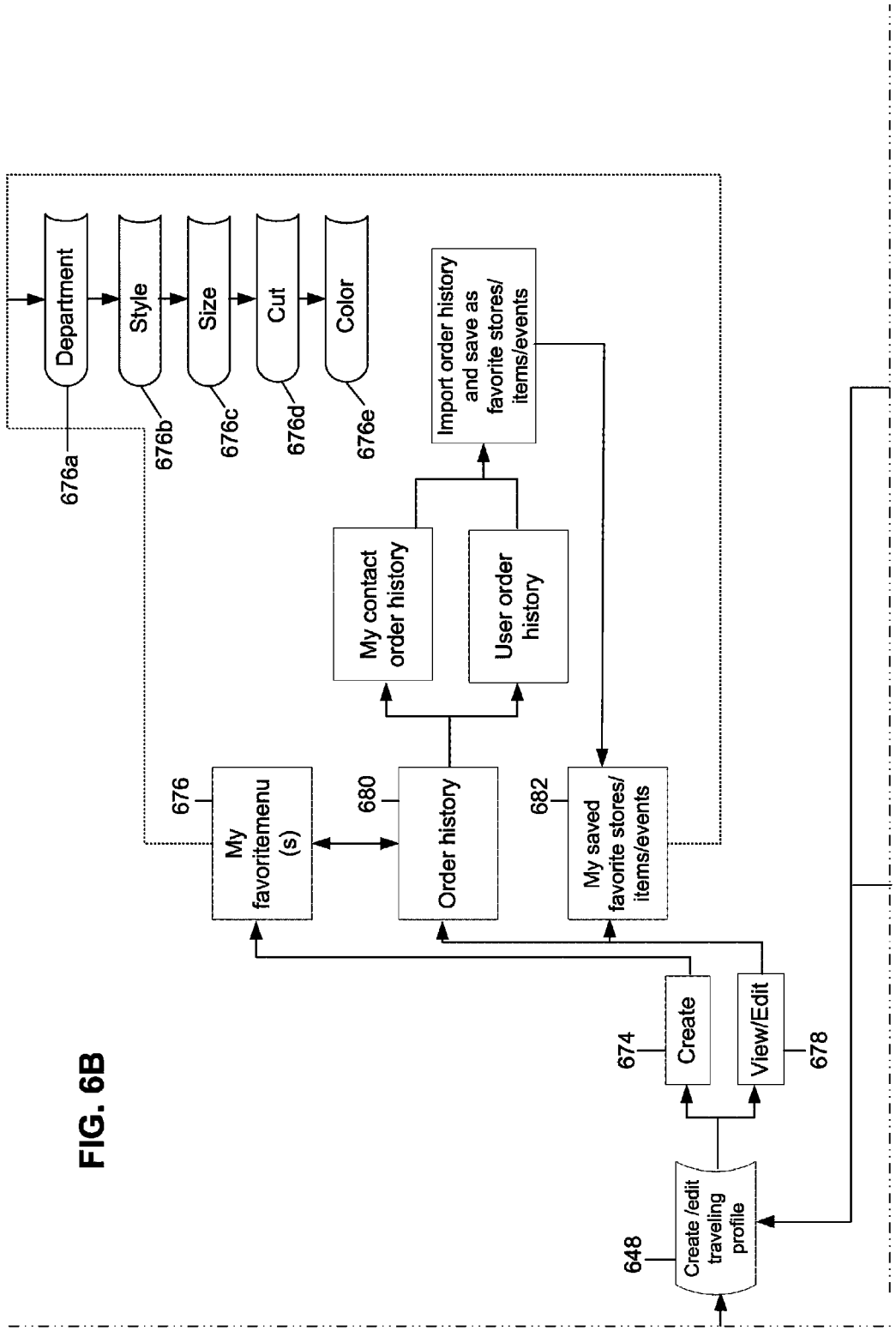
FIG. 6 is a flow diagram showing the process flow through a web site implementing the efficiency system of the invention for preordering clothing for consideration by a customer during a shopping trip.
Figure 6C:
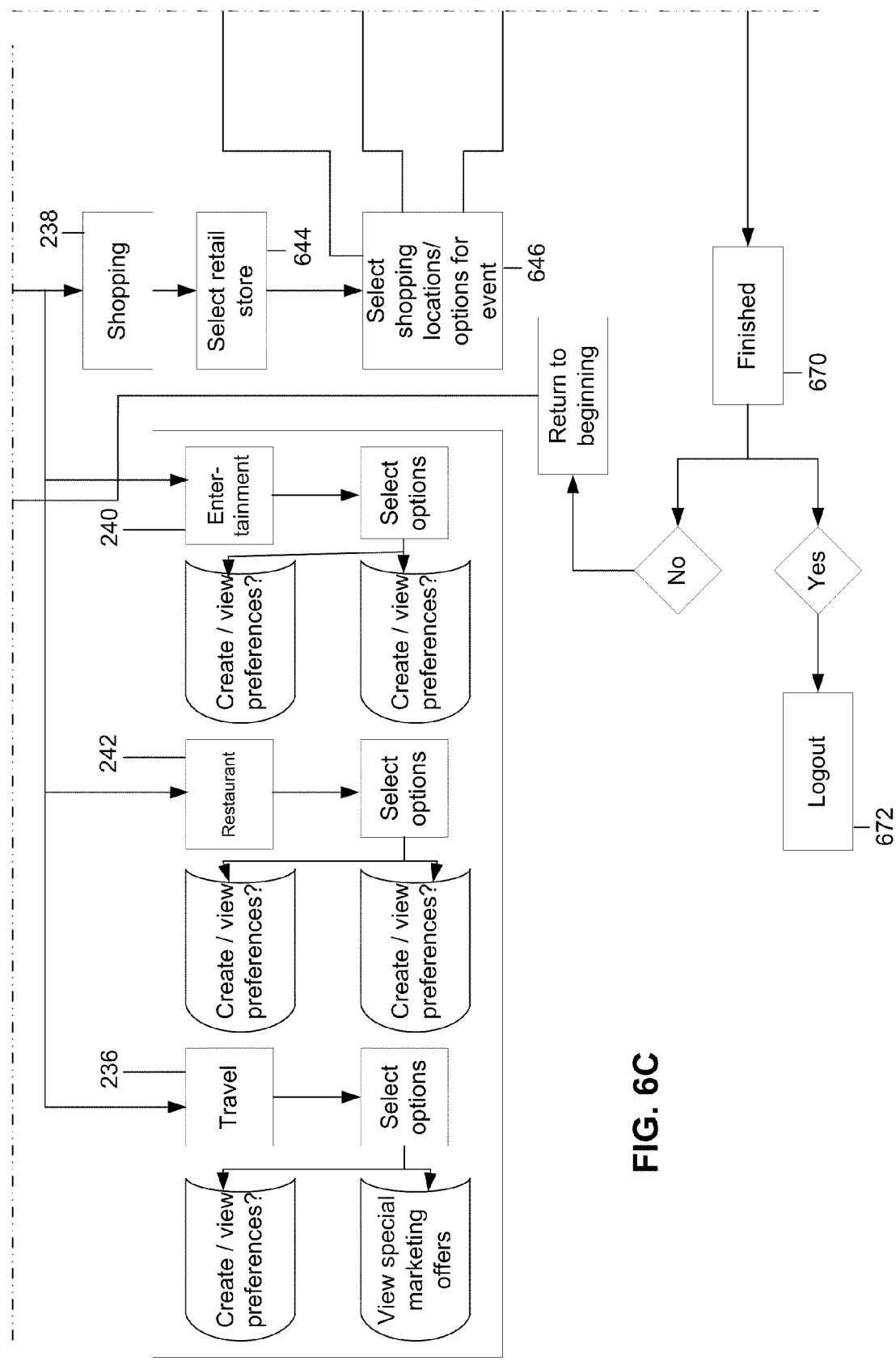
Figure 6D:
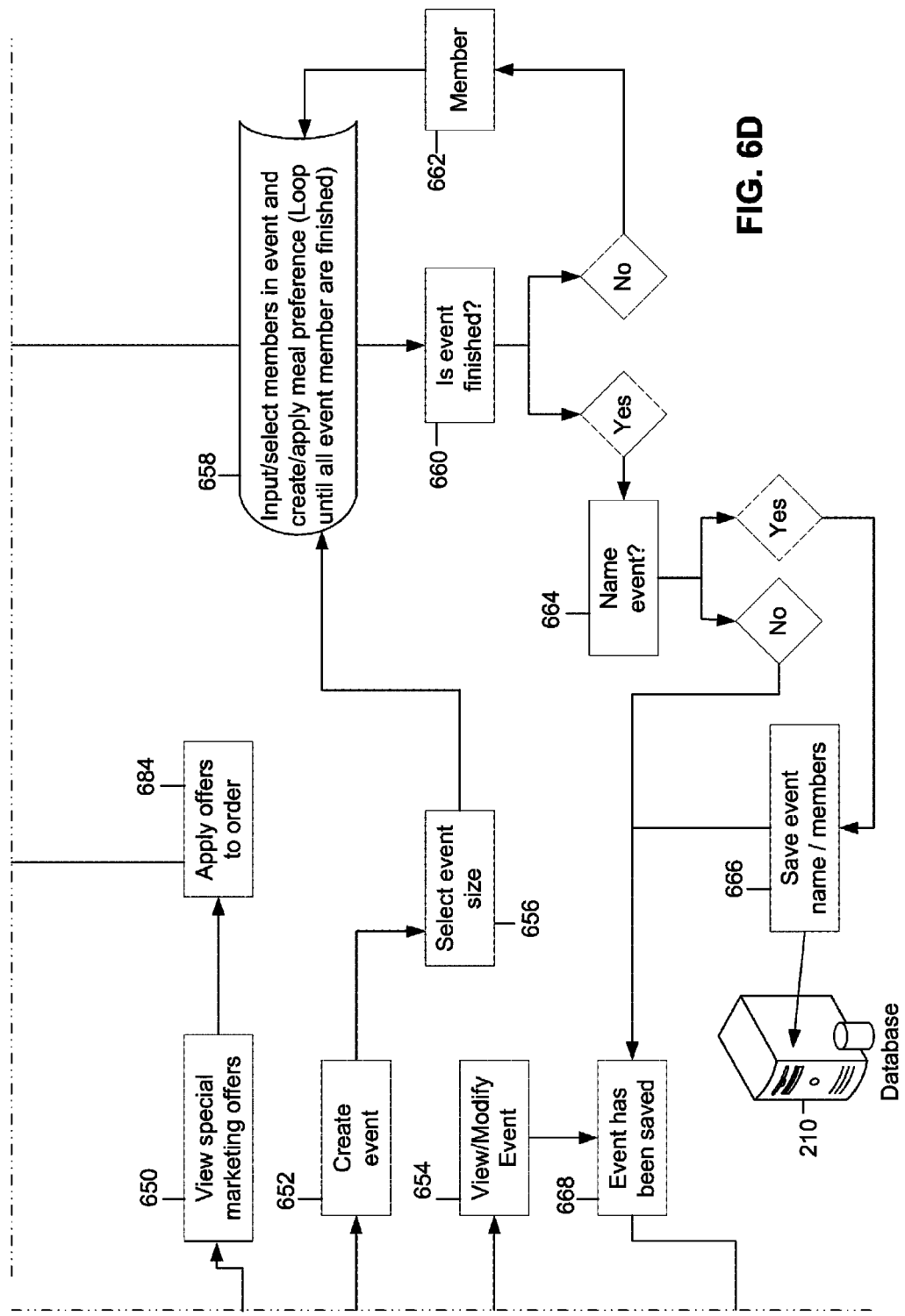

If the customer elects the shopping option 238 in FIG. 2, a flow similar to that illustrated in FIG. 2 will present the customer with similar options for creating or implementing the customer's shopping profile. Such a flow is illustrated in FIG. 6, where the options utilize the same profile database system as those described above with respect to FIG. 2 and thus have been given similar reference labels (for example, 648 corresponds to 248 and the like). For example, as shown in FIG. 6, the customer's profile may identify the types of consumer goods and the stores the customer prefers. This profile may be made available to approved members (e.g., friends and family) to facilitate consumer purchases for the customer by the customer's authorized contacts (e.g., friends and family). Each customer also may have the option to purchase gift options (e.g., points, dollars, credits, and other gifting options) toward another customer's account to be used at any of the companies accessible through the web site of FIG. 2, including those in the restaurant, travel and entertainment segments. Also, the customer's profile may be used to provide precision marketing of sales information and special offers to the customer(s) in all areas of the consumer marketplace.

Figure 7B:
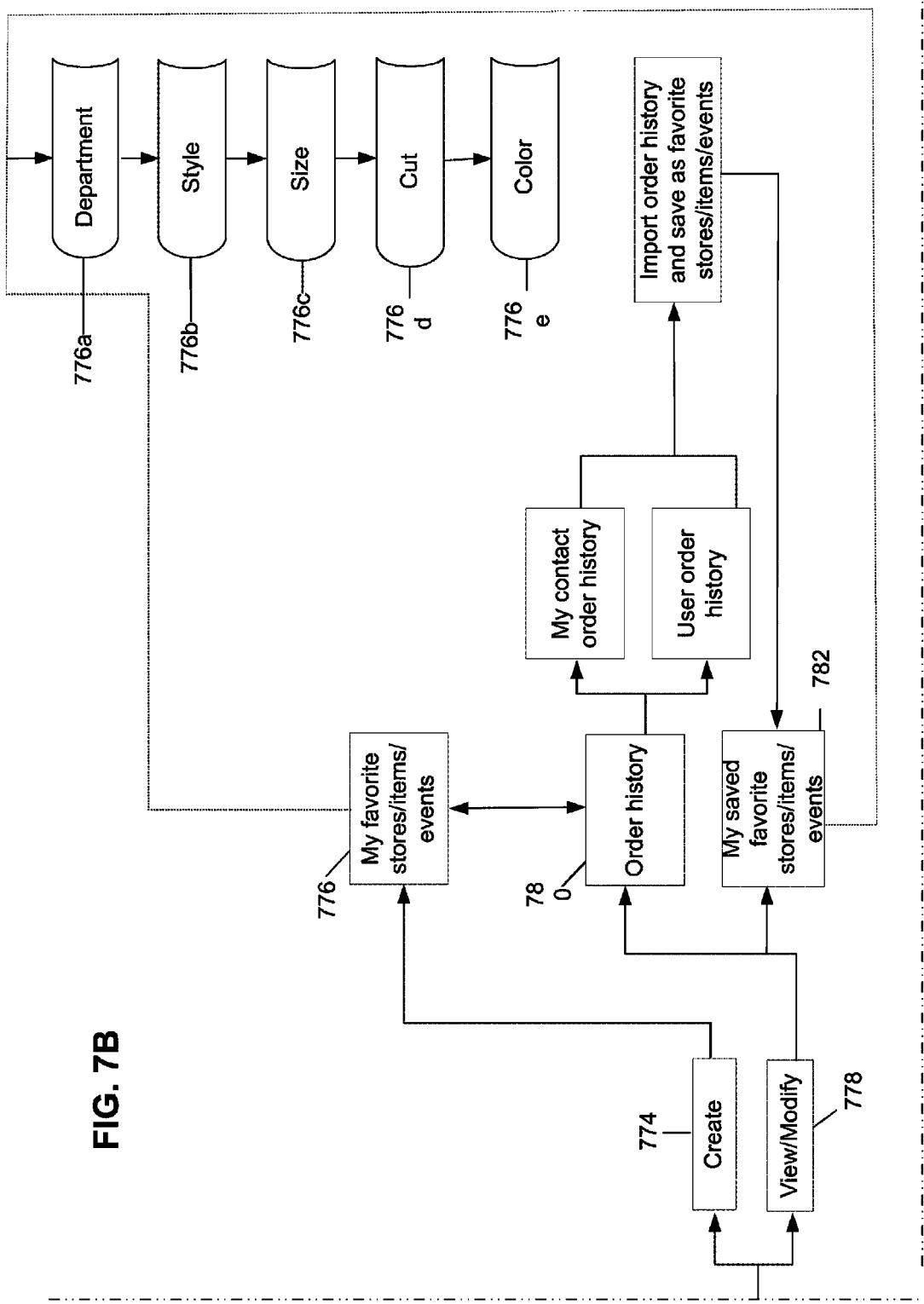
FIG. 7 is a flow diagram showing the process flow through a kiosk or customer terminal available on-site at a store to create and/or access the customer's profile and shopping event data.
Figure 7C:
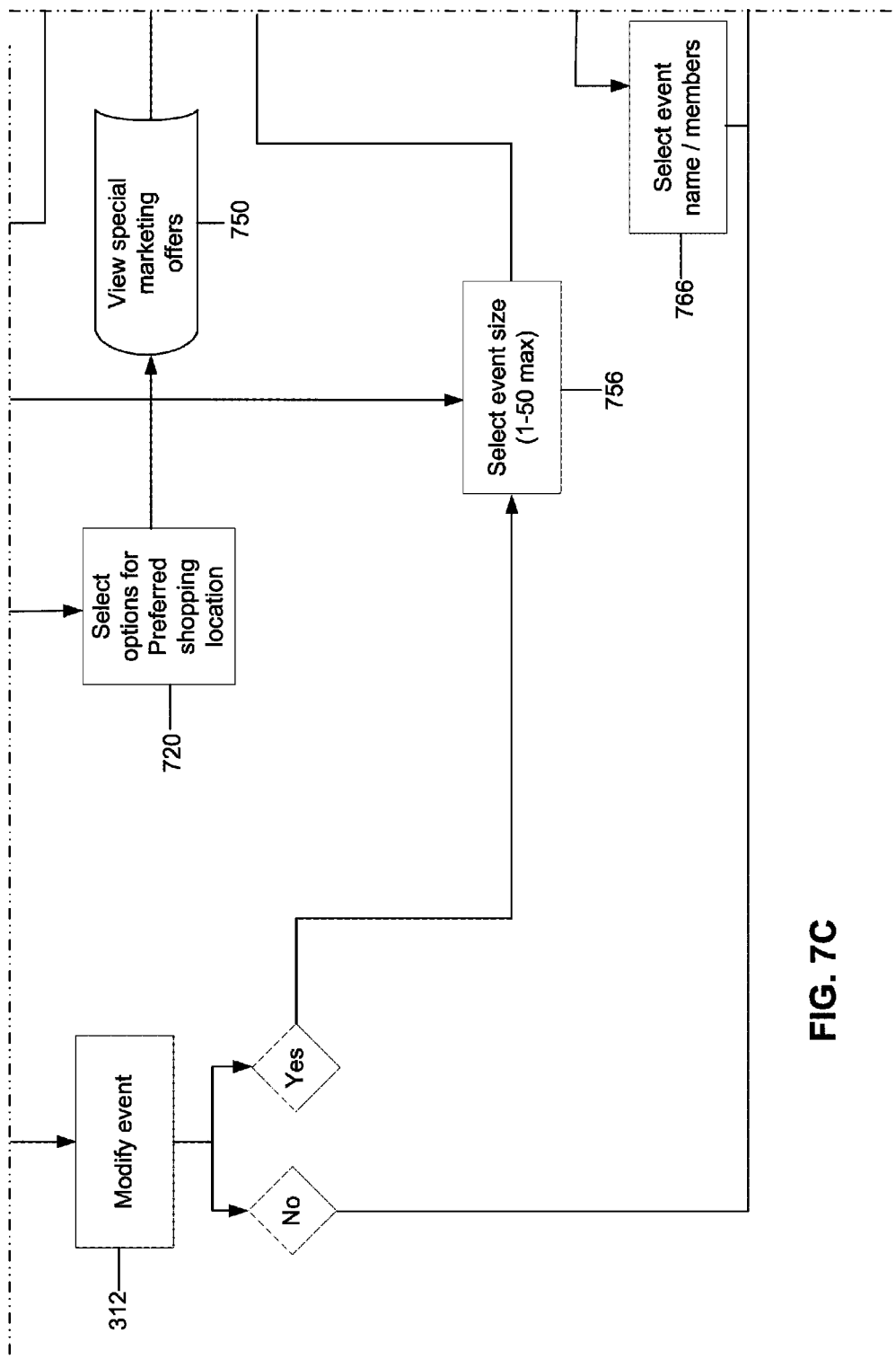
Figure 7D:
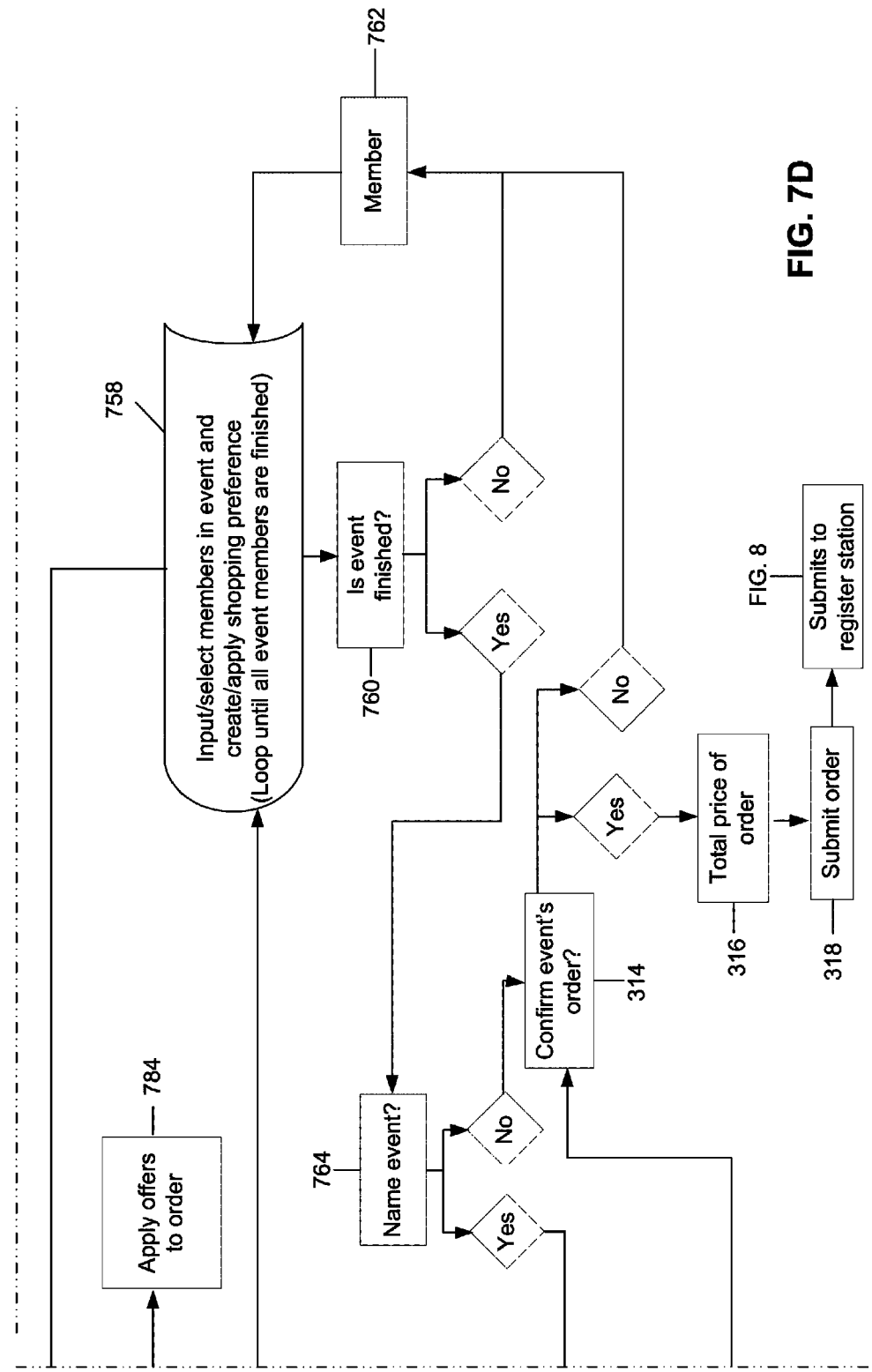

In the shopping embodiment of FIG. 6, a customer can either shop for himself or herself or for another contact whose email address they know and are authorized to use to create a shopping event at 653. Each shopping event will be set according to the customer's preferences such as, sleeve length, neck size, shape of cut, athletic build, petite, wide sole, color scheme (e.g., earth tone), brand names, material type, celebrity choices according to the customer's posted public/private profile. This gives the customer the opportunity to shop for himself/herself and/or another contact using the contact's public profile and/or private profile when they are so authorized. Preferences can be utilized at any kiosk or online via the website and customer profile database of the invention as described above with respect to FIG. 2. A sample kiosk flow for the shopping embodiment is illustrated in FIG. 7, where the options are generally the same as those described above with respect to FIG. 3 and thus have been given similar reference labels (for example, 748 corresponds to 348 and the like). The customer can log on to the profile and create an event at 652 where the customer utilizes his/her preferences for a most efficient shopping experience. For example, a customer can go to a retail store and find a store sales clerk with pre-selected clothes according to size, color tone, etc. for their pre-registered event in a comfortable dressing room so he/she can purchase items that they really want without spending an entire afternoon looking for the right items to purchase, thus eliminating many opportunities for returned items and wasted time.

Figure 8:
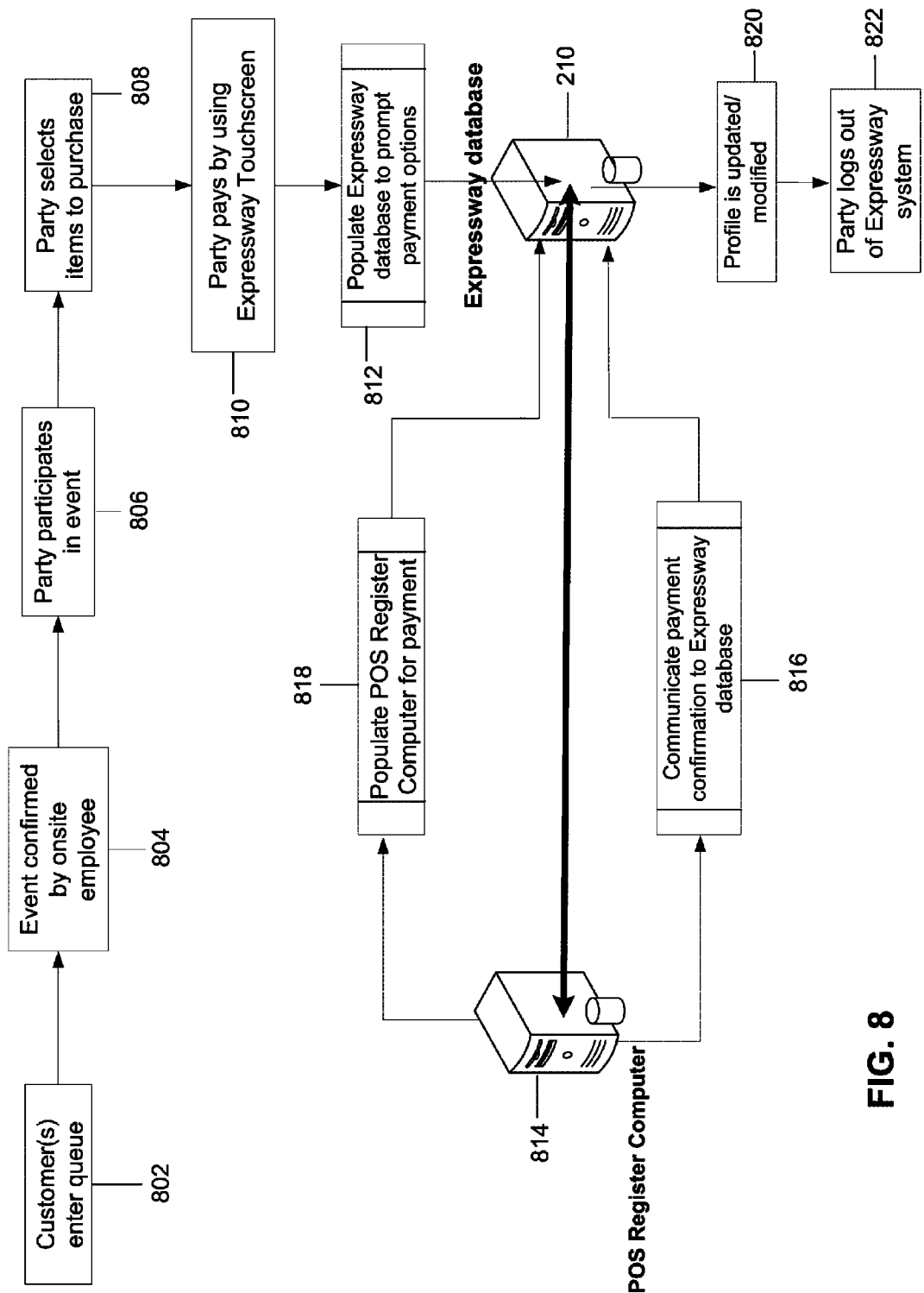
FIG. 8 is a flow diagram illustrating the fulfillment of a reserved shopping event created in the embodiment of FIGS. 6 and 7.

FIG. 8 illustrates the fulfillment of a reserved shopping event (FIG. 7). As illustrated, the shopping event is confirmed at an employee kiosk (like hostess station 400 in FIG. 4) by an onsite employee at 804. The party participates in the event at the designated time at 806 and selects items for purchase at 808. The party pays for the selected items at 810 and the database 210 is updated at 812 to prompt payment options, including any special offers, discount opportunities, etc. Payment at a point of sale (POS) register computer 814 is made by communicating payment authorization (816) and populating the POS register computer 814 for payment (818). The customer's profile is updated/modified and saved at 820 and the customer exits at 822.

An added benefit of this embodiment is that a customer can send and receive gifting opportunities for shopping events via the system of the invention. The approved customer (giftor) can do this by accessing the customer's (giftee's) pre-registered event list (e.g., wedding or birthday) and distribute gift options (e.g., points, dollars, credits, and other gifting options) and specified limit for the customer to spend during the set shopping event or for a period of time designated by the giftor. This eliminates many uncomfortable situations while still offering a personalized gift solution gifting opportunity. The calendared events set by each customer also will let other authorized customers see upcoming events that are important to a particular customer (e.g., wedding shower, baby shower, birthdays, bar mitzvah etc.). Store owners will appreciate the ease of volume control estimation provided by booking future shopping events, as is available to restaurants and other categories using the techniques of the invention. Therefore, the stores with overstock can quickly distribute items without deep discounting to those with similar style preferences using the system of the invention.

In a multiple user shopping event, the customers can visit several locations consecutively set as a tour of shopping. For example, each customer can set their shopping needs such as bathing suits and evening gowns for day of shopping. Furthermore, the event can be split into multiple locations (e.g., 10:00 Nordstrom, 10:30 Gap, 11:00 Nieman Marcus, 11:30 Wet Seal) and enjoy lunch at a participating restaurant in the system database located in the same shopping mall at 12:00 pm, all set with each customer's preset profile consumer preferences pre-registered at each location. Additionally, when stores roll out their new lines, customers can be notified by email or similar communication (e.g., test message or sounder) of items they would be interested in based on their profile.

Travel

Figure 9B:
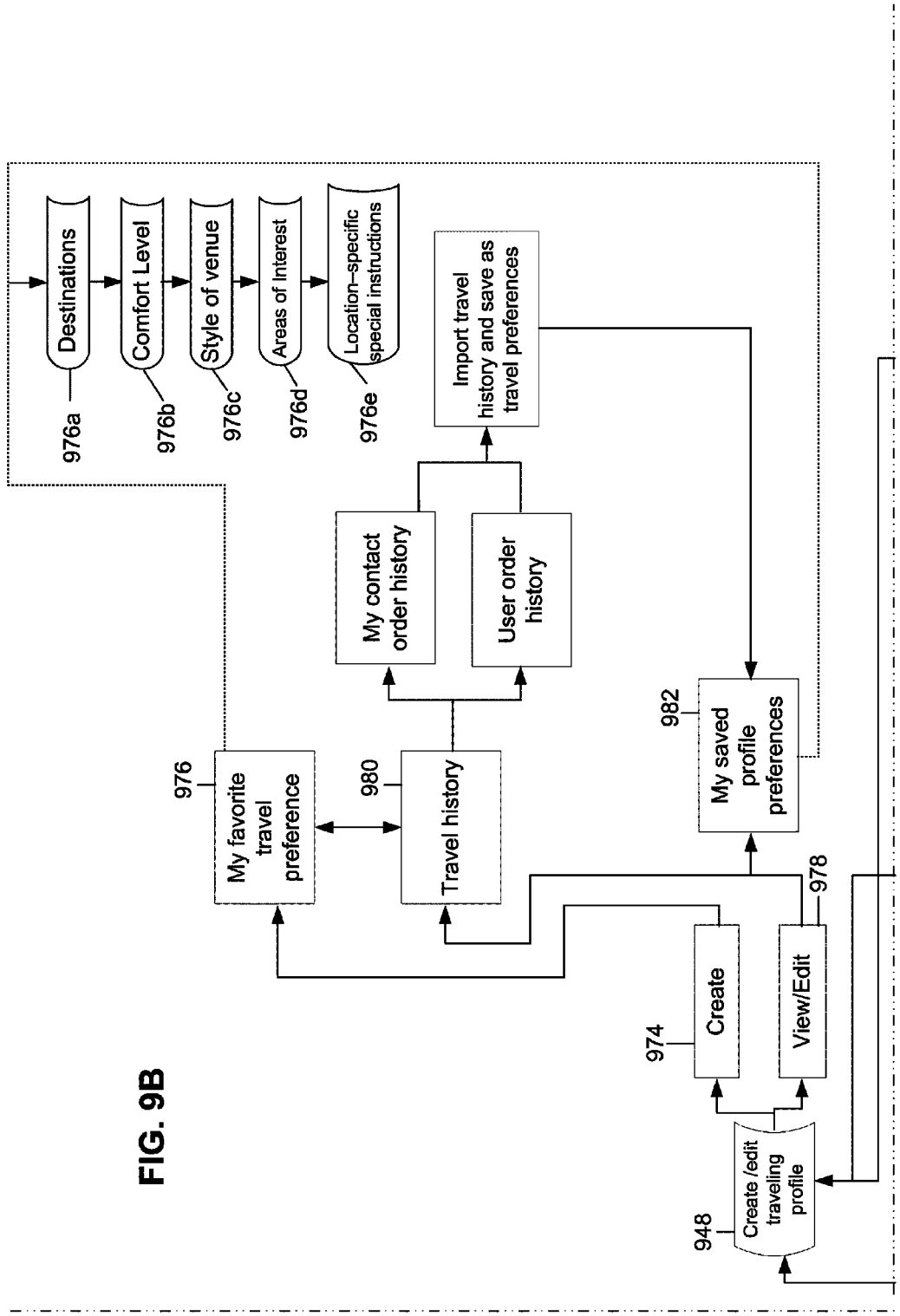
FIG. 9 is a flow diagram showing the process flow through a web site implementing the efficiency system of the invention for ordering customized travel services.
Figure 9C:
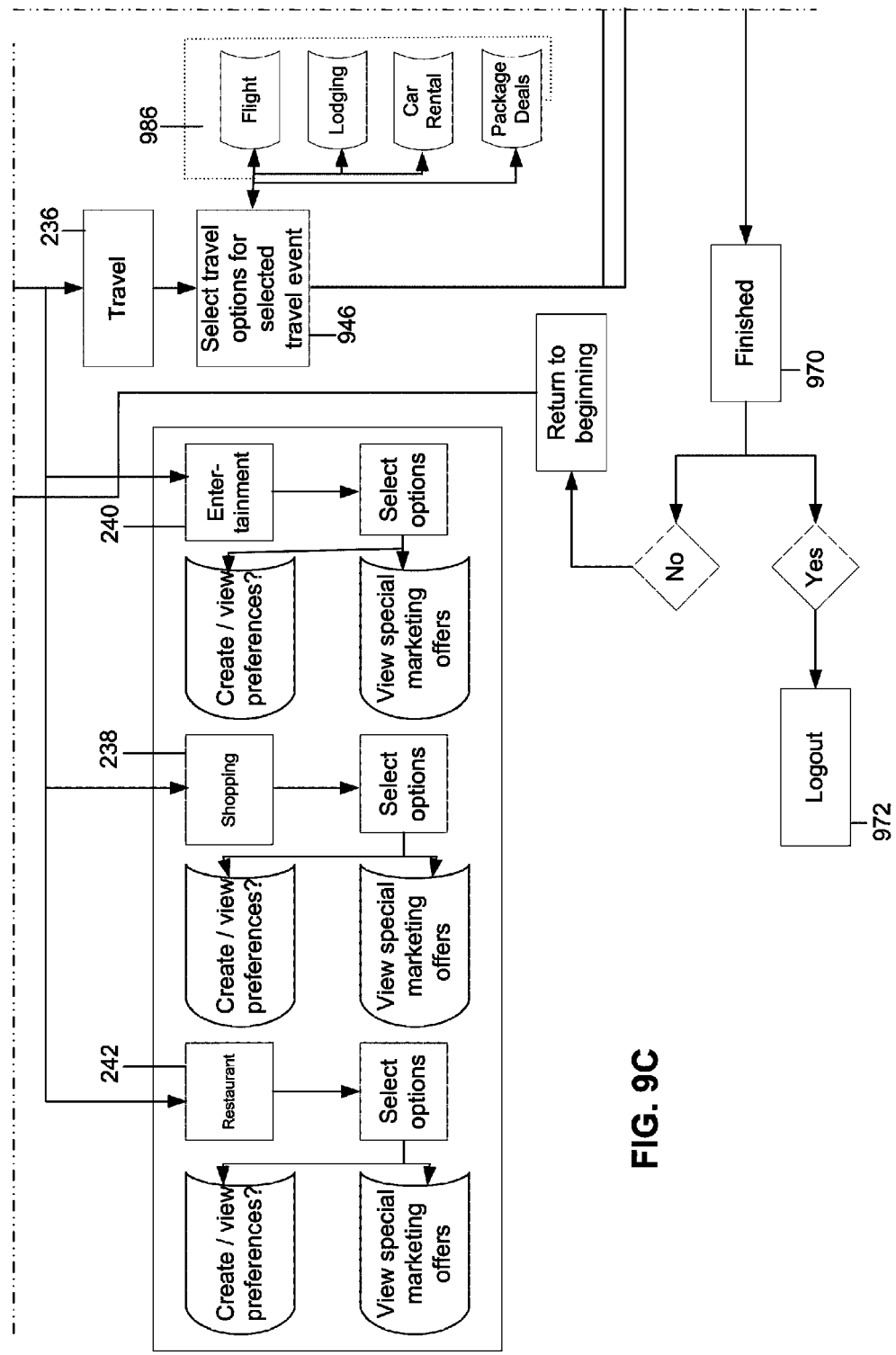
Figure 9D:
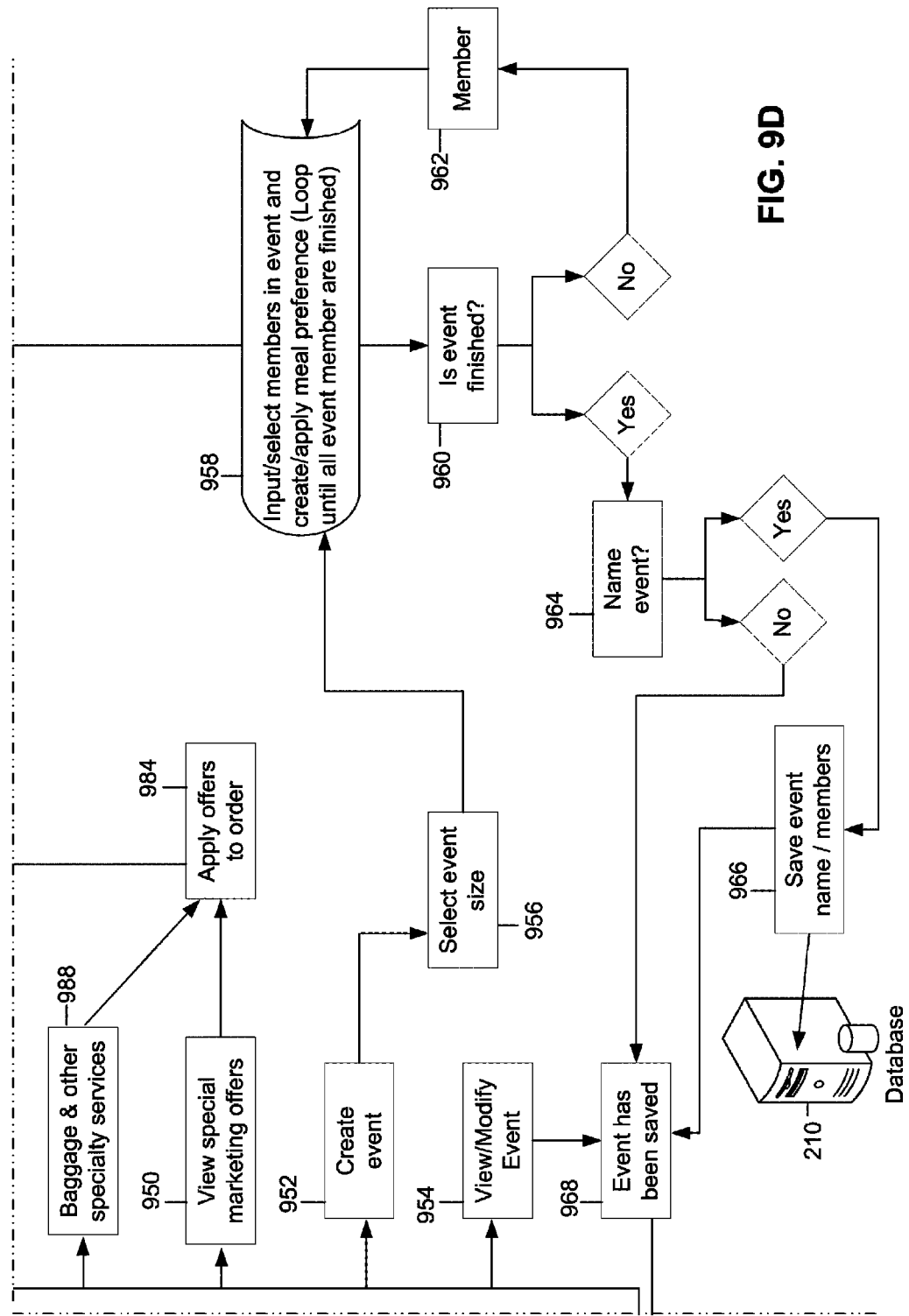

If the customer selects the travel option 236 in FIG. 2, a flow similar to that illustrated in FIG. 2 will present the customer with similar options for creating or implementing the customer's travel profile. Such a flow is illustrated in FIG. 9, where the options utilize the same profile database system as those described above with respect to FIG. 2 and thus have been given similar reference labels (for example, 948 corresponds to 248 and the like). For example, as shown in FIG. 9, the customer's profile may identify the types of flights/planes, preferred flight times, lodgings, car rental agencies and vehicles, and package deals that appeal to the customer (986). The customer's profile may also include the customer's preferred seat choice (aisle or window; tail or wing; class sectioning), food preference, and check-in process that is to be applied to each reservation. The customer's travel profile may be forwarded to any independent third party travel service to facilitate the customer's travel arrangements by the travel service.

Under the travel category, there are several options for personalized service. As a whole, the system is used to not only provide notification of travel hotspots, but can present packages according to the tastes of each customer denoted in their personal profile. For example, if a customer enjoys New York and San Francisco and makes frequent travel to these destinations, and while in these cities, the customer frequents upscale restaurants (e.g., 3 stars or better and hotels 3 stars or better), the customer's profile can be used to offer the customer a first class trip to London as fares come in from travel partners into the database that meet the customer's profile. Moreover, by accepting the offer the customer would be given a select few choices set according his/her specific traveling preferences.

As an example of such a choice, while booking his/her reservation or after the reservation is confirmed, the customer also may elect to use an optional Hassle-Free Baggage Service (988) whereby the customer may elect to have his/her boxed baggage transported to his/her confirmed destination within a chosen time frame (e.g., 24 hours) in advance of travel so that the customer's baggage may be waiting at the customer's destination hotel (at the customer's reserved room, if available) prior to the customer's arrival. If this service is elected, the customer would leave his/her boxed baggage and attached reservation confirmation at the door of his/her place of business or residence at least 24 hours prior to departure. The boxed baggage, after confirmation approval, would then be transferred via an express carrier service of an express carrier partner to the city and hotel destination supplied on the confirmation itinerary. Upon the arrival of the boxed baggage to the customer's choice of hotel, the hospitality staff of the hotel will deliver the boxed baggage to the corresponding room noted on the customer's confirmation itinerary before noon the day of the customer's flight arrival. The price of this service is adjusted in accordance with the weight/size requirements, time constraints, and restrictions of the express carrier service. The customer's travel profile may also be used to provide precision marketing to the customer as sell as last minute deals and the like based on the customer's most frequently and most recently traveled destinations.

As a further example, the customer's meal preferences could be used in the restaurant embodiment above to pre-register the customer for meals at a local restaurant meeting, as part of an event package, all of the customer's profile requirements and preferences. In this case, a combined travel/restaurant event would be created as a customized event using the customer's profile data from different profile categories. The customer could thus enjoy traveling without the stress of planning, hauling baggage, and wasting time on logistics.

To illustrate further, the customer could fly into his/her desired destination and go strait to his/her favorite restaurant in the destination city knowing that his/her baggage will be waiting in his/her hotel room. On the logistics side of the event, by storing favorite destinations and/or dream locations, meal preferences, and lodging inclinations, the system of the invention will automatically assess available travel deals that are custom designed to the customer's exact purchasing preferences. Therefore, the customer receives only applicable options based on his/her purchasing affinity for his/her event package.

Figure 10B:
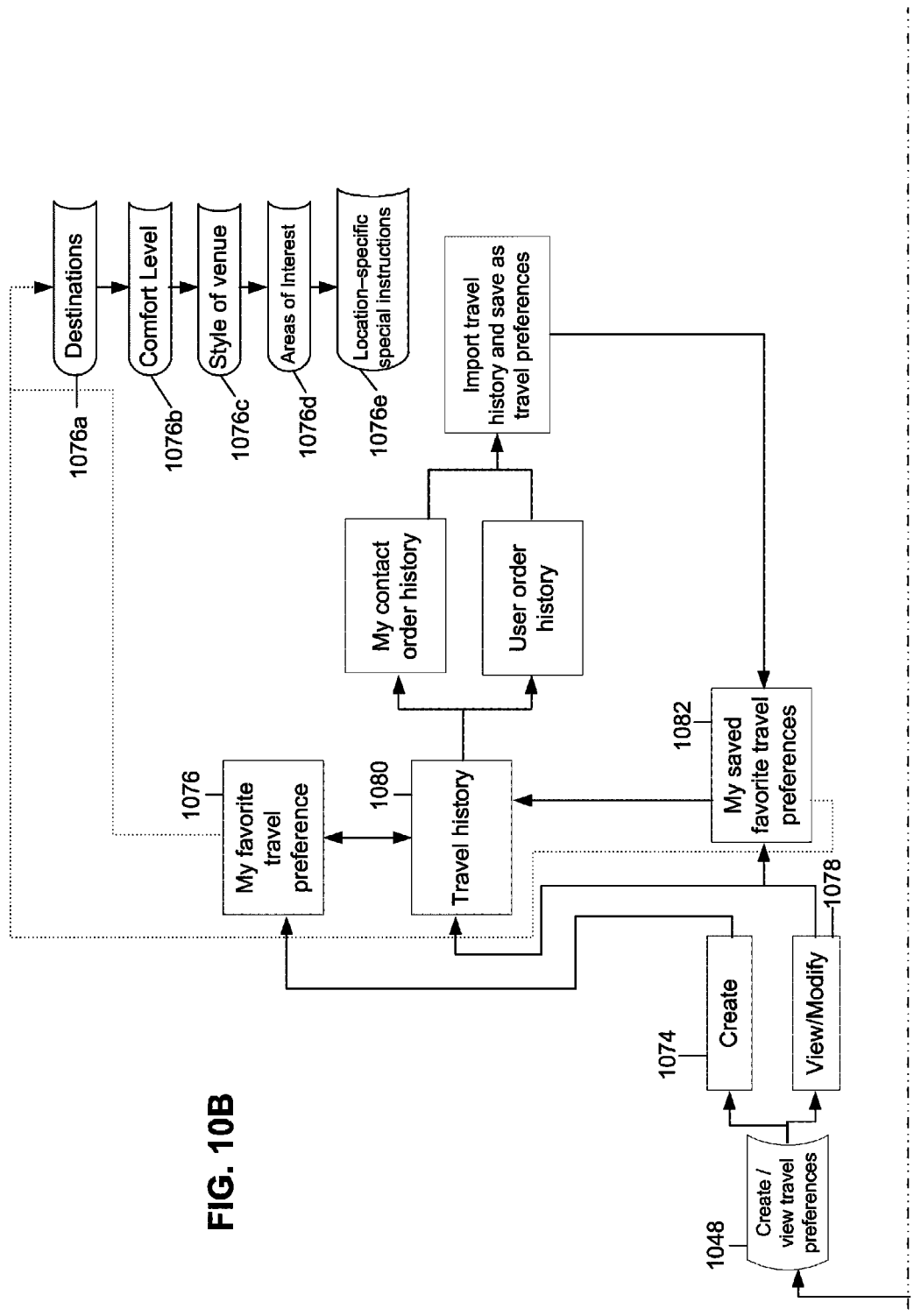
FIGS. 10-11 is a flow diagram showing the process flow through a kiosk or customer terminal available on-site at a store to create and/or access the customer's profile and travel event data.
Figure 10C:
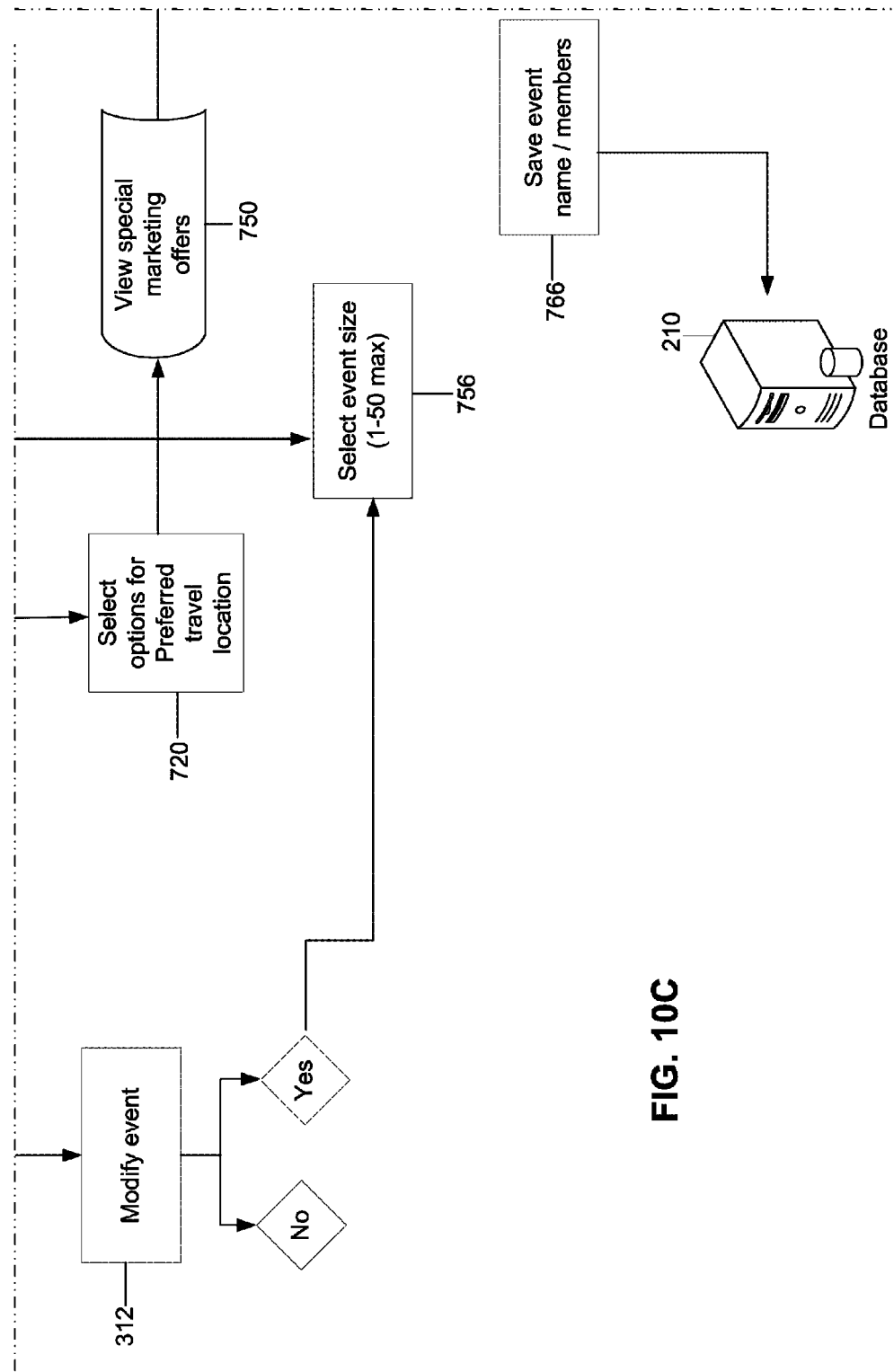
Figure 10D:
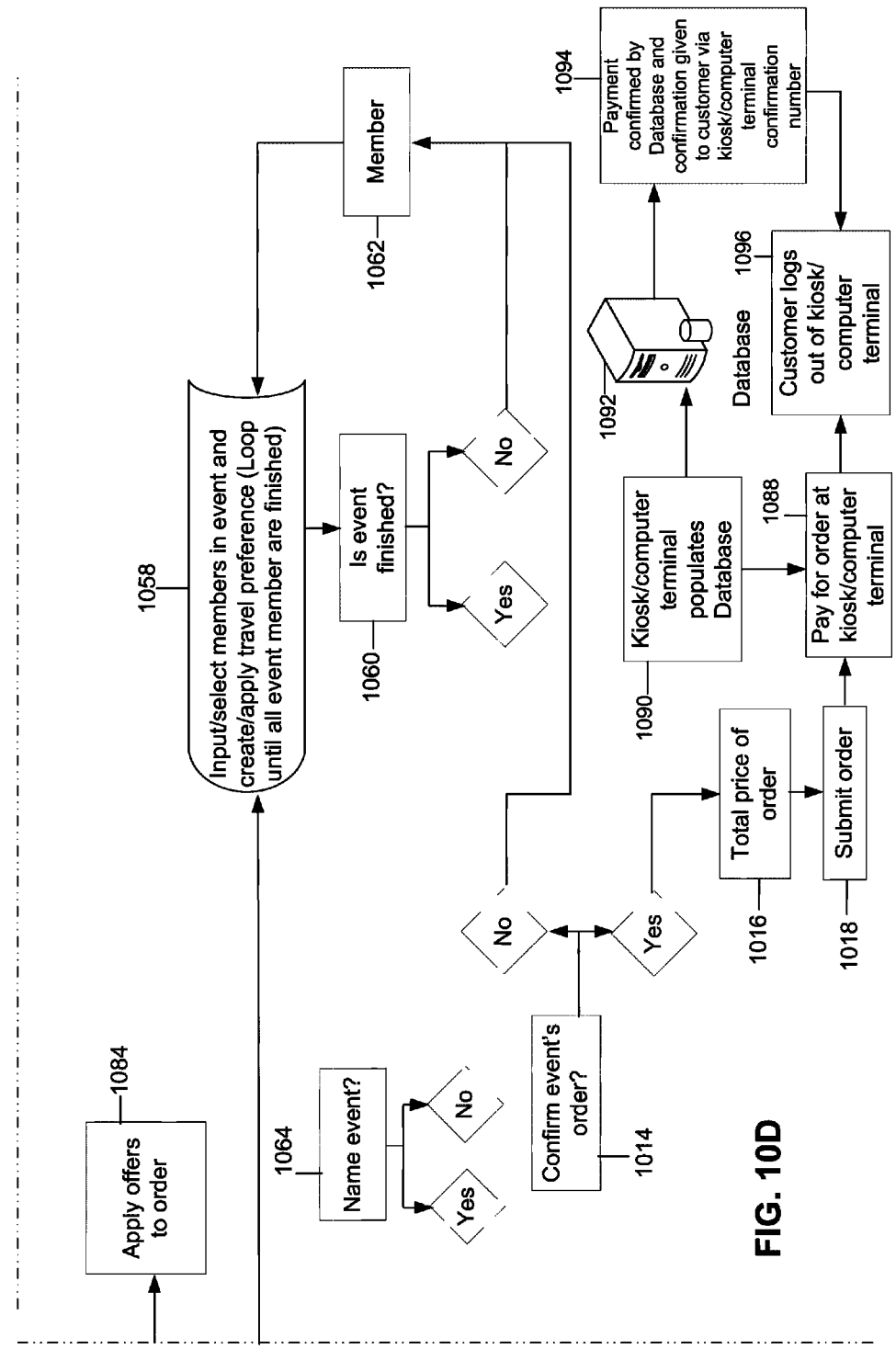
Figure 11:
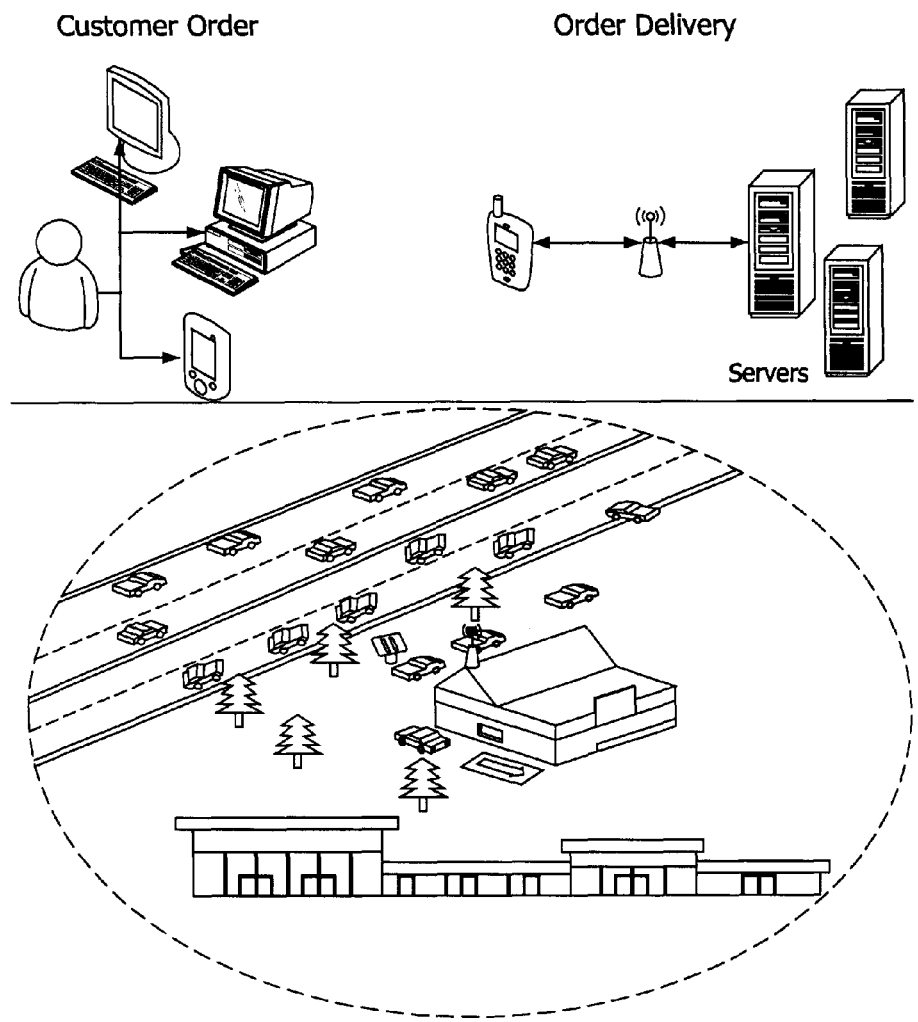

A sample kiosk flow for the travel embodiment is illustrated in FIGS. 10-11, where the options are generally the same as those described above with respect to FIG. 3 and thus have been given similar reference labels (for example, 1048 corresponds to 348 and the like). In the kiosk example, the customer's profile is similarly used to make flight arrangements and to arrange for specialty services, such as the aforementioned baggage shipping. Once the travel order is complete, the travel order may be submitted to a kiosk/computer terminal 1088 for payment. The resulting payment data may be used to populate (1090) a payment database 1092. Payment confirmation is provided to the customer at 1094, and the customer logs out at 1096.

As a further example, a more technology savvy customer could access the same convenience through a hand-held GPS device that would guide the customer through his/her trip itinerary with the same convenient choices established from the customer's profile. For example, the same customer arriving in London Heathrow would have satellite connection through a handheld GPS device that would instruct the customer from the airport to the airport rental car hub to a designated dinner location where a pre-registered meal event is waiting there for the customer's approval. The GPS system would then guide the customer to a preferred hotel. At the hotel, the customer would find his/her baggage secured in his/her room after express check-in at a kiosk (FIG. 3) in the hotel lobby. Because the customer only stays at lodging sites meeting the customer's preferences (e.g., exercise room and hot breakfast available), the customer will never be surprised with faulty lodging advertising common in current online booking applications. Even more convenient, the customer who appreciates all of the efficiencies provided by the system of the invention may choose to stay at a hotel property where the customer will find the system of the invention installed in the hotel's restaurant and/or lobby. In places where time is extremely limited and planning is crucial, the invention will facilitate the sharing of meals with clients in between business meetings onsite at the hotel property preplanned as one event including baggage, flight, lodging, meeting, and meal events. The resulting trip would be maximally convenient, productive and hassle-free.

Entertainment

If the customer elects the entertainment option 240 in FIG. 2, a flow similar to that illustrated in FIG. 2 will present the customer with similar options for creating or implementing the customer's entertainment profile. For example, the customer may identify the type of movies he/she likes to watch and the types of sporting events he/she likes to attend. This information may be used to provide targeted marketing of appealing entertainment options and last minute discounts to the customer in a manner similar to that described above with respect to the travel option 236.

Summary

The efficiency system of the invention frees service providers to spend more time on actual customer service with many attendant benefits including customization of services to the customer, reduced wait time for the customer, increased turnover and profits for the service provider, improved direct marketing options for the service provider, and better records of customer purchases. These and other beneficial characteristics will be apparent to those skilled in the art based on the above-mentioned features of the invention.

It should be understood that this invention is not limited to the particular embodiments disclosed, but it is intended to cover modifications within the spirit and scope of the present invention as defined by the appended claims. The invention is intended to cover all aspects of consumer purchasing whereby a consumer may select products and/or services in any and all categories of the consumer profile database of the invention, including categories other than restaurants, travel, shopping, and entertainment. Also, the consumer selections may be made as part of a single event or as part of a tour of events. Those skilled in the art will further appreciate that the method of the invention may be implemented in software and distributed using a computer storage medium and that such software may be processed by a computer processor to convert a general purpose computer into a special purpose processing system that implements the functional characteristics of the software as herein described. Also, the reservations including the food order and the shopping events, etc. may be printed out at the on-site kiosk and handed to the hostess or attendant for those situations where the hostess or attendant does not have access to a computer that may received the reservation/event electronically. All such aspects of the invention are intended to be covered by the appended claims.

What is claimed:

1. A computer-implemented method for improving efficiency of delivering products and/or services to a customer at a restaurant, shopping, travel, or entertainment venue, comprising:
   a computer receiving from the customer, prior to arrival at said venue, a reservation including a preorder of the products and/or services the customer wishes to receive upon arrival at the restaurant, shopping, travel, or entertainment venue;
   further comprising a customer payment account for the preorder of products and/or services prior to receiving delivery of products and/or services;
   the computer validating the reservation upon receipt of an indication that the customer has arrived at the selected restaurant, shopping, travel, or entertainment venue and entering the customer in a preparation queue of a vendor management system;
   the vendor management system determining when a wait time for the customer in the queue is less than or equal to a preparation time for preparing the preorder of products and/or services and forwarding the preorder of products and/or services of the validated reservation to a preparation queue vendor management system, and/or other vendor system for preparation at or before the time the customer is available to receive delivery of products and/or services; and
   storing in a database a record of the customer's purchases in a customer profile.

2. The method of claim 1, wherein the customer profile stored in the database includes at least the customer's preferences for restaurants, shopping, travel, entertainment, and/or combinations thereof.

3. The method of claim 1, wherein the customer's reservation includes a preorder of products and/or services for members of a party; and
   wherein the validating includes validating the reservation when at least one member of the party is present at the restaurant, shopping, travel, or entertainment venue and available to receive delivery of products and/or services at the selected restaurant, shopping, travel, or entertainment venue.

4. The method of claim 3, wherein the reservation is created by the customer accessing a website including a menu for the restaurant, shopping, travel, or entertainment venue from which one or more members of the party create the preorder of products and/or services.

5. The method of claim 4, further comprising selecting at least a portion of the preorder of products and/or services from a list of favorite menu items off of the restaurant, shopping, travel, or entertainment menu for at least one member of the party, said list of favorite menu items being stored in the customer profile for said at least one member of the party.

6. The method of claim 3, wherein the reservation is created by the customer accessing a kiosk or computer terminal located at or near the restaurant, shopping, travel, or entertainment venue including a menu for the restaurant, shopping, travel, or venue from which one or more members of the party create the preorder of products and/or services.

7. The method of claim 6, further comprising selecting at least a portion of the preorder of products and/or services from a list of favorite menu items off of the restaurant, shopping, travel, or entertainment menu for at least one member of the party, said list of favorite menu items being stored in the customer profile for said at least one member of the party.

8. The method of claim 4, wherein the reservation is accessed by the customer and the presence of said at least one member of the party at the restaurant, shopping, travel, or entertainment venue is validated using a kiosk or computer terminal located at or near the restaurant, shopping, travel, or entertainment venue, and the contents of the reservation are modified as appropriate, approved, and confirmed by said at least one member of the party.

9. The method of claim 8, wherein the confirmed reservation is forwarded to a vendor management system for placing the party in a queue to receive delivery of products and/or services.

10. The method of claim 3, wherein the customer profile identifies preferences of the customer including a list of favorite menu items available from said restaurant, shopping, travel, or entertainment venue.

11. The method of claim 10, wherein the customer is offered special offers from the restaurant, shopping, travel, or entertainment venue based on the contents of the customer's profile.

12. The method of claim 10, wherein the customer profile is linked to a unique customer identifier and access to the customer profile is denied without said unique customer identifier.

13. The method of claim 12, wherein the unique customer identifier comprises a biometric scan, an access card, a retinal scan, a password, profile name, biometric identification data, email address and the like, some other unique identification, or key fob or the like.

14. The method of claim 3, further comprising storing the customer's preorder in a database and using the customer's preorder in precision marketing to the customer and/or providing discount offers, special offers, and/or gifting options to the customer.

15. The method of claim 10, wherein the customer profile further includes the customer's travel preferences, shopping preferences, entertainment preferences, hospitality preferences, and/or combinations thereof.

16. The method of claim 1, wherein the reservation is part of an event package that utilizes the customer profile to preselect travel, shopping, entertainment, hospitality, and dining services for the customer based on the customer's preferences in the customer profile.

17. The method of claim 16, wherein the event package comprises a travel itinerary specifying travel, shopping, entertainment, hospitality, and dining services based on the customer profile, further comprising using a handheld GPS device to guide the customer through the travel itinerary based on the customer's location as determined by the handheld GPS device.

18. A computer-implemented system that improves efficiency of delivering products and/or services to a customer at a restaurant, shopping, travel, or entertainment venue, comprising:
   a customer mobile device and application program;
   a vendor point of sale (POS) register and/or vendor kiosk;
   a vendor server; and
   a vendor computer comprising an operating system, a processor, a database, a memory and/or remote memory storage;
   wherein the vendor computer receives from a customer, via Internet or other means of establishng a communications link between the computers, prior to arrival at said venue, a reservation including a preorder of the products and/or services the customer wishes to receive upon arrival at the restaurant, shopping, travel, or entertainment venue;

further comprising a customer payment account for the preorder of products and/or services prior to receiving delivery of products and/or services;

the customer mobile device, vendor POS register and/or vendor kiosk, vendor server, and/or vendor computer validates the reservation upon receipt of an indication that the customer has arrived at the selected restaurant, shopping, travel, or entertainment venue and enters the customer in a preparation queue of a vendor management system;

the vendor management system determines when a wait time for the customer in the queue is less than or equal to a preparation time for preparing the preorder of products and/or services and forwards the preorder of products and/or services of the validated reservation to the preparation queue, vendor management system, and/or other vendor system for preparation at or before the time the customer is available to receive delivery of products and/or services; and storing, in a database, a record of the customer's purchases in a customer profile.

19. The system of claim 18, wherein the customer profile stored in the database includes at least the customer's preferences for restaurants, shopping, travel, entertainment, and/or combinations thereof.

20. The system of claim 18, wherein the customer's reservation includes a preorder of products and/or services for members of a party; and wherein the validating includes validating the reservation when at least one member of the party is present at the restaurant, shopping, travel, or entertainment venue and available to receive delivery of products and/or services at the selected restaurant, shopping, travel, or entertainment venue.

21. The system of claim 20, wherein the reservation is created by the customer accessing a website or application program including a menu for the restaurant, shopping, travel, or entertainment venue from which one or more members of the party create the preorder of products and/or services.

22. The system of claim 21, further comprising selecting at least a portion of the preorder of products and/or services from a list of favorite menu items off of the restaurant, shopping, travel, or entertainment menu for at least one member of the party, said list of favorite menu items being stored in the customer profile for said at least one member of the party.

23. The system of claim 20, wherein the reservation is created by the customer accessing a touch screen device, kiosk, or computer terminal located at or near the restaurant, shopping, travel, or entertainment venue including a menu for the restaurant, shopping, travel, or venue from which one or more members of the party create the preorder of products and/or services.

24. The system of claim 23, further comprising selecting at least a portion of the preorder of products and/or services from a list of favorite menu items off of the restaurant, shopping, travel, or entertainment menu for at least one member of the party, said list of favorite menu items being stored in the customer profile for said at least one member of the party.

25. The system of claim 21, wherein the reservation is accessed by the customer and the presence of said at least one member of the party at the restaurant, shopping, travel, or entertainment venue is validated using a touch screen device, kiosk, or computer terminal located at or near the restaurant, shopping, travel, or entertainment venue, and the contents of the reservation are modified as appropriate, approved, and confirmed by said at least one member of the party.

26. The system of claim 25, wherein the confirmed reservation is forwarded to a vendor management system for placing the party in a queue to receive delivery of products and/or services.

27. The system of claim 20, wherein the customer profile identifies preferences of the customer including a list of favorite menu items available from said restaurant, shopping, travel, or entertainment venue.

28. The system of claim 27, wherein the customer is offered special offers from the restaurant, shopping, travel, or entertainment venue based on the contents of the customer's profile.

29. The system of claim 27, wherein the customer profile is linked to a unique customer identifier and access to the customer profile is denied without said unique customer identifier.

30. The system of claim 29, wherein the unique customer identifier comprises a biometric scan, an access card, a retinal scan, a password, profile name, biometric identification data, email address and the like, some other unique identification, or key fob or the like.

31. The system of claim 20, further comprising storing the customer's preorder in a database and using the customer's preorder in precision marketing to the customer and/or providing discount offers, special offers, and/or gifting options to the customer.

32. The system of claim 27, wherein the customer profile further includes the customer's travel preferences, shopping preferences, entertainment preferences, hospitality preferences, and/or combinations thereof.

33. The system of claim 18, wherein the reservation is part of an event package that utilizes the customer profile to preselect travel, shopping, entertainment, hospitality, and/or dining services for the customer based on the customer's preferences in the customer profile.

34. The system of claim 33, wherein the event package comprises a travel itinerary specifying travel, shopping, entertainment, hospitality, and/or dining services based on the customer profile, further comprising using a handheld GPS device to guide the customer through the travel itinerary based on the customer's location as determined by the handheld GPS device or application program.

* * * * *